US012801515B2

(12) United States Patent
Kunjappa et al.

(10) Patent No.: US 12,801,515 B2
(45) Date of Patent: Nov. 17, 2026

(54) DYNAMIC BENCHMARKING OF COMBINATIONS OF MAIN AND SUB LIBRARIES FOR LIBRARY DEVELOPER OPERATIONS (LIBOPS)

(71) Applicant: Kyndryl, Inc., New York, NY (US)

(72) Inventors: Reeth Kunjappa, Bengaluru (IN); Veeresh Bushetti, Savanur (IN); Nalini M, Chennai (IN); Kalpesh Sharma, Bangalore (IN)

(73) Assignee: Kyndryl, Inc., New York, NY (US)

( * ) Notice: Subject to any disclaimer, the term of this patent is extended or adjusted under 35 U.S.C. 154(b) by 294 days.

(21) Appl. No.: 18/597,989

(22) Filed: Mar. 7, 2024

(65) Prior Publication Data

US 2025/0284621 A1 Sep. 11, 2025

(51) Int. Cl.
*G06F 11/3668* (2025.01)
*G06F 8/41* (2018.01)
*G06F 8/71* (2018.01)

(52) U.S. Cl.
CPC .......... *G06F 11/3692* (2013.01); *G06F 8/433* (2013.01); *G06F 8/71* (2013.01)

(58) Field of Classification Search
CPC ......... G06F 8/433; G06F 8/71; G06F 11/3692
USPC .................................. 717/120–124, 168–170
See application file for complete search history.

(56) References Cited

U.S. PATENT DOCUMENTS 5,812,849 A * 9/1998 Nykiel ................. G06F 9/5066 707/999.102
5,950,201 A 9/1999 Van et al.
8,595,715 B2 11/2013 Ward et al.
10,114,637 B1 10/2018 Willson et al.
11,294,643 B2 * 4/2022 Kadam ................. G06F 21/577
11,354,108 B2 * 6/2022 Sridhara ........... G06F 16/24578
(Continued)

FOREIGN PATENT DOCUMENTS

CN 116233249 A * 6/2023 ......... H04L 67/1095
KR 102163501 B1 10/2020

OTHER PUBLICATIONS

Levandoski et al., "RecBench: Benchmarks for Evaluating Performance of Recommender System Architectures", 2011, Proceedings of the VLDB Endowment, vol. 4, No. 11, pp. 911-920. (Year: 2011).*

(Continued)

*Primary Examiner* — Ted T. Vo
(74) *Attorney, Agent, or Firm* — CANTOR COLBURN LLP; Erik Swanson

(57) ABSTRACT

A computer implemented method and system for supporting self-assessed upgrades using dynamic benchmarking of combinations of main and sub libraries for carrying out Library Developer Operations (LibOps) includes identifying a software library module being used in a software application, identifying dependencies and upgrades for the software library module, identifying a latest software library module version, identifying a change.log module for the latest software library module version, wherein the change.log module includes a record of all changes to the software library module, categorizing breaking changes and deprecated features for the latest software library module version and generating an upgrade score and suggesting recommendations responsive to the upgrade score.

20 Claims, 23 Drawing Sheets

(56) References Cited

U.S. PATENT DOCUMENTS

| | | | |
|---|---|---|---|
| 12,393,700 | B1 * | 8/2025 | Apostolopoulos .... G06F 21/577 |
| 2021/0374558 | A1 | 12/2021 | Tommasi et al. |
| 2022/0197606 | A1 | 6/2022 | Rodgers et al. |
| 2022/0197625 | A1 | 6/2022 | Franchitti |
| 2022/0197770 | A1 | 6/2022 | Tan et al. |
| 2022/0269594 | A1 | 8/2022 | Makkar |

OTHER PUBLICATIONS

Tomatensalat et al., “Shared library and modules with versioning”, 2022, Software Engineering Stack Exchange, retrieved from https://softwareengineering.stackexchange.com/questions/430848/shared-library-and-modules-with-versioning , 4 pages. (Year: 2022).*

Anonymous, “A Method to AI Automatically Balance Upgrade Libraries by Distribution Systems,” IP.com, IPCOM000268947D, Mar. 10, 2022, 6 pages.

Spinellis, “Package Management Systems,” Tools of the Trade, The IEEE Computer Society, 2012, pp. 84-86.

* cited by examiner

| S. No | Test cases | Test Status | Overal Status |
|---|---|---|---|
| 1 | Critical | Fail | Fail |
| 2 | Major | Pass | |
| 3 | Major | Pass | |
| 4 | Minor | Pass | |

| S. No | Test cases | Test Status | Overal Status |
|---|---|---|---|
| 1 | Critical | Pass | Fail |
| 2 | Major | Fail | |
| 3 | Minor | Pass | |
| 4 | Minor | Pass | |

| S. No | Test cases | Test Status | Overal Status |
|---|---|---|---|
| 1 | Critical | Pass | Pass |
| 2 | Major | Pass | |
| 3 | Minor | Fail | |
| 4 | Minor | Pass | |

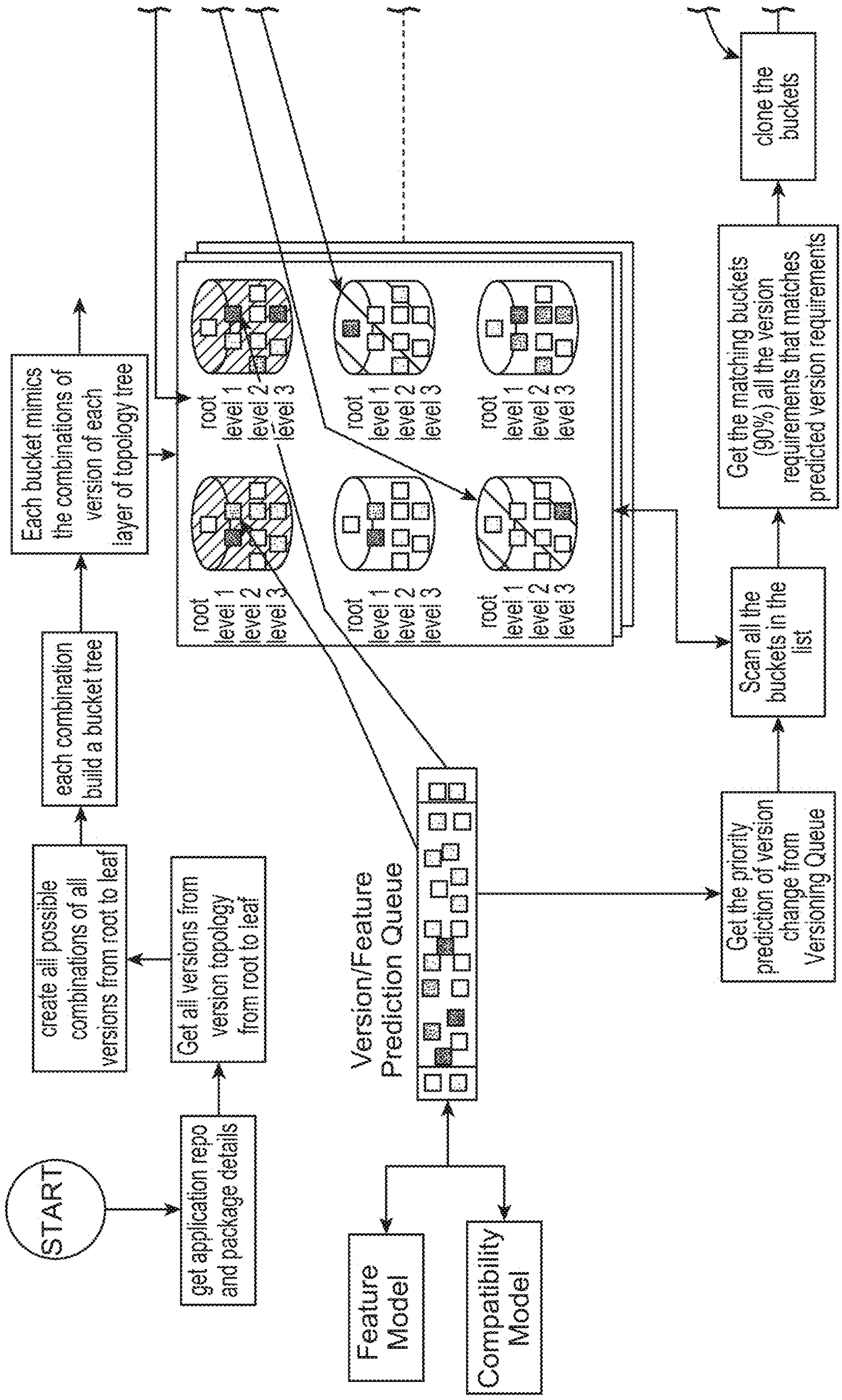
FIG. 9A1

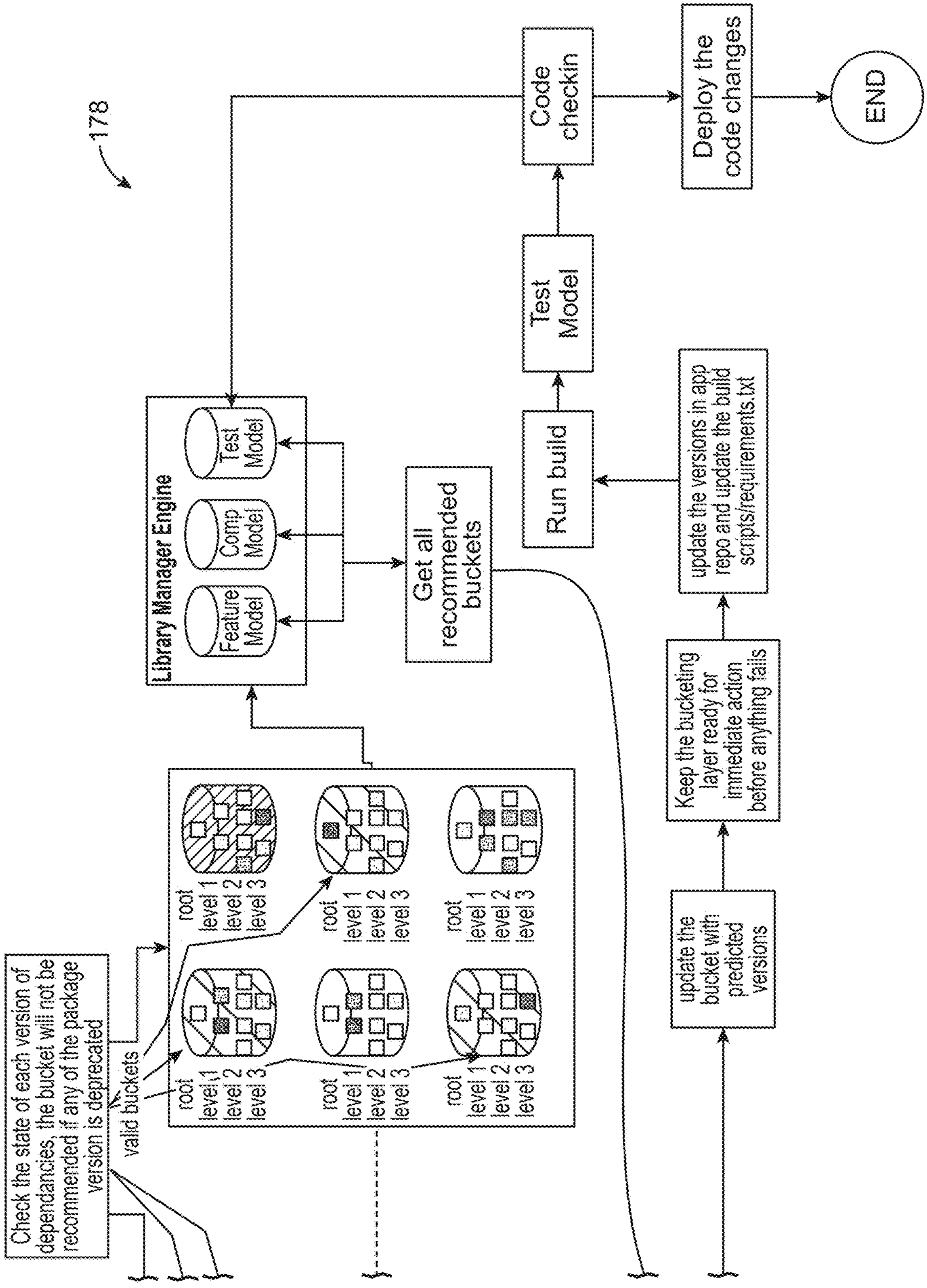
FIG. 9A2

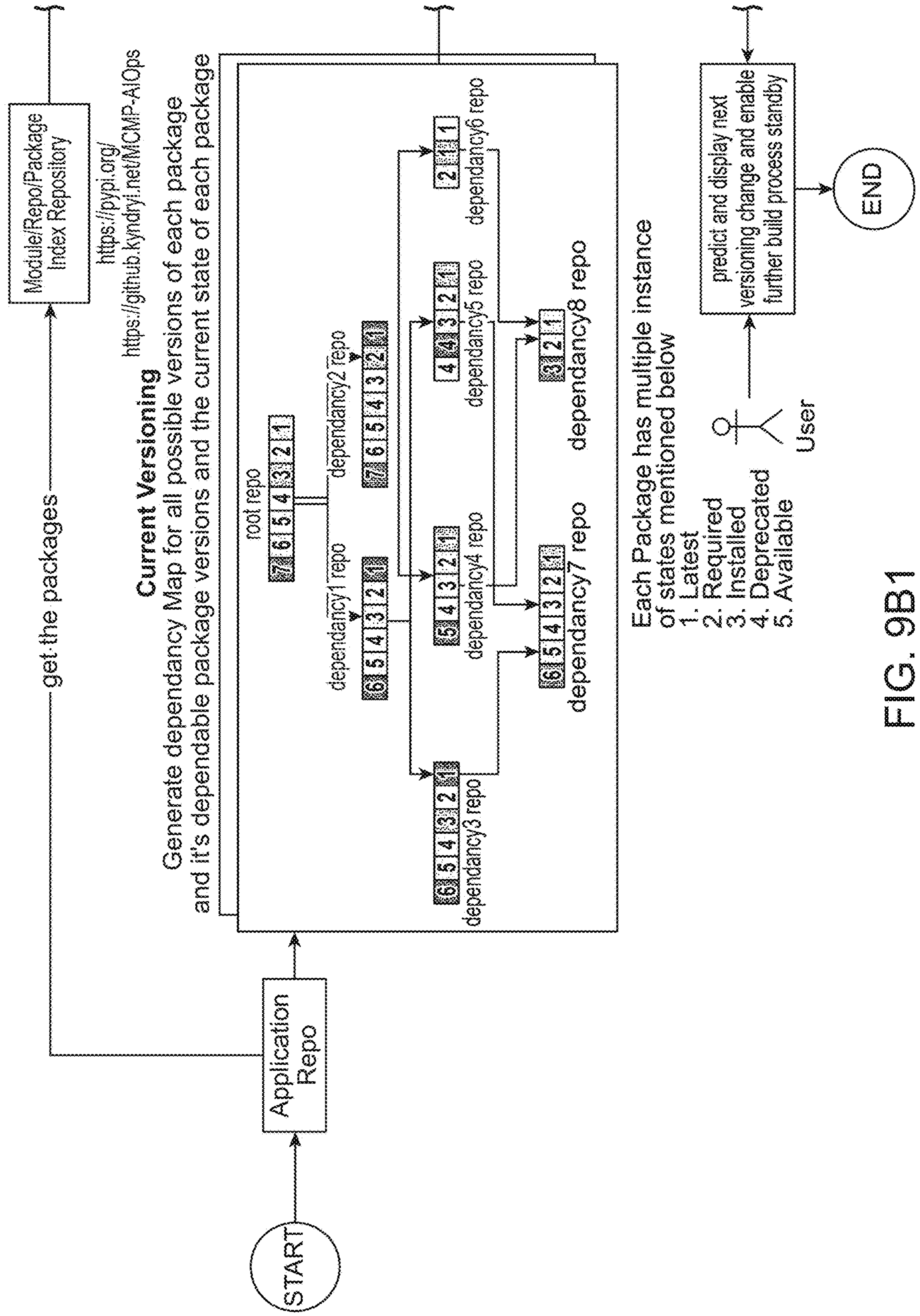
FIG. 9B1

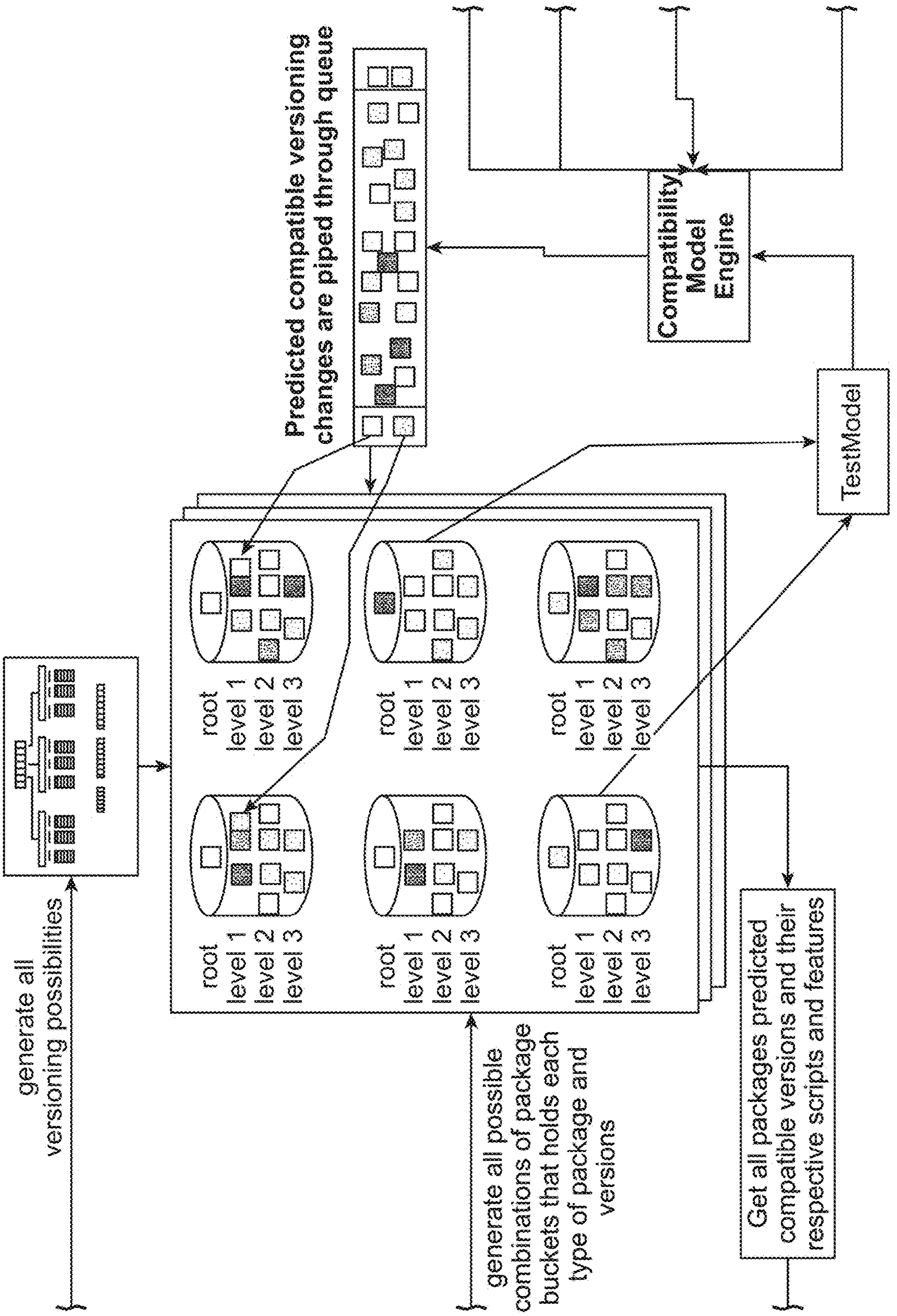
FIG. 9B2

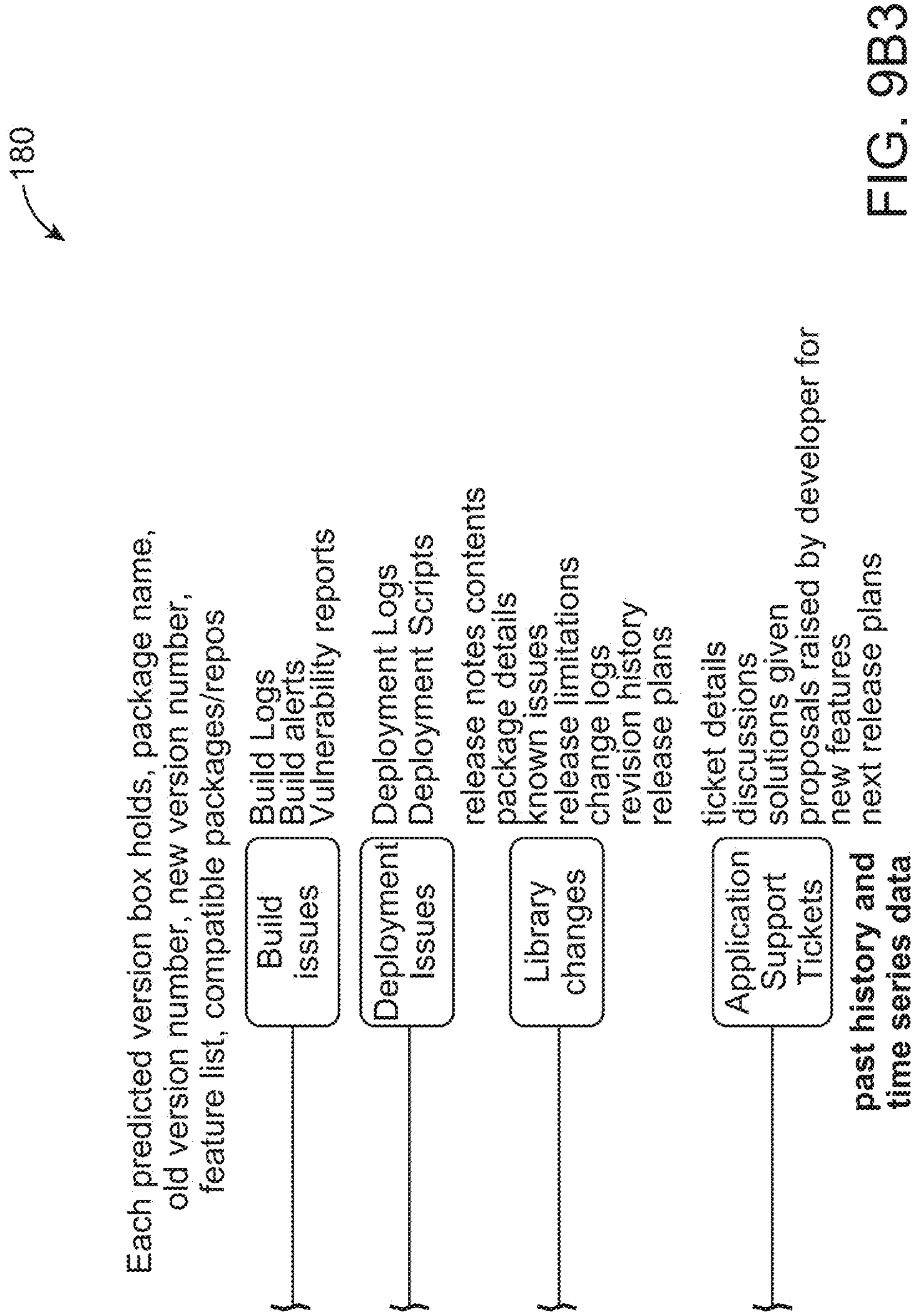
FIG. 9B3

DYNAMIC BENCHMARKING OF COMBINATIONS OF MAIN AND SUB LIBRARIES FOR LIBRARY DEVELOPER OPERATIONS (LIBOPS)

BACKGROUND

The present invention generally relates to software libraries, and more particularly, to a system and method to support self-assessed upgrades of the libraries for carrying out Library Developer Operations (LibOps).

Currently, most software projects (big and small) use multiple open source or licensed libraries for development. In fact, applications primarily run on front-end and back-end programming languages which include library dependencies. It is important to upgrade the libraries for several reasons, including application of security patches to reduce vulnerabilities and to defend against cyberattack, early identification of deprecated functionality, application of fixes for known bugs in the library by having the latest versions of the libraries or software, adoption of new functionality, as well adopting a look and feel. All of these reasons act to boost performance of the software by providing software operational stability, compatibility and security. Delaying these updates may impact the overall end user experience.

SUMMARY

Embodiments are directed to a computer implemented method for supporting self-assessed upgrades using dynamic benchmarking of combinations of main and sub libraries for carrying out Library Developer Operations (LibOps). The method includes identifying a software library module being used in a software application, identifying dependencies and upgrades for the software library module, identifying a latest software library module version, identifying a change.log module for the latest software library module version, wherein the change.log module includes a record of all changes to the software library module, categorizing breaking changes and deprecated features for the latest software library module version and generating an upgrade score and suggesting recommendations responsive to the upgrade score Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 9A1 is a flowchart illustrating a method for implementing a versioning model according to one or more embodiments of the present invention;

FIG. 9A2 is a continuation of the flowchart of FIG. 9A1 illustrating a method for implementing a versioning model according to one or more embodiments of the present invention;

FIG. 9B1 is a flowchart illustrating a method for implementing a compatibility model, according to one or more embodiments of the present invention;

FIG. 9B2 is a continuation of the flowchart of FIG. 9B1 illustrating a method for implementing a compatibility model, according to one or more embodiments of the present invention;

FIG. 9B3 is a continuation of the flowchart of FIG. 9B1 and FIG. 9B2 illustrating a method for implementing a compatibility model, according to one or more embodiments of the present invention;

DETAILED DESCRIPTION

Figure 1:
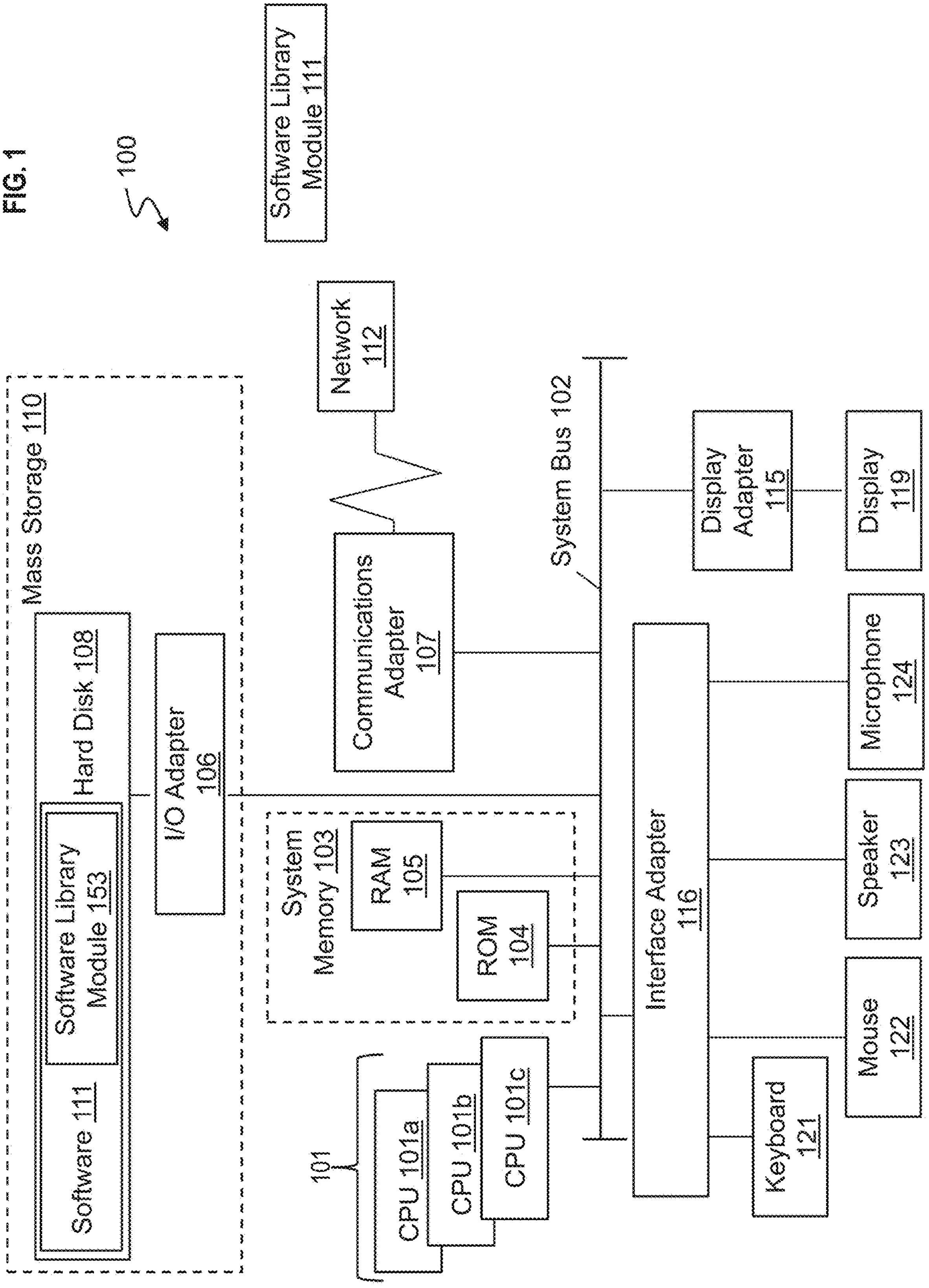
FIG. 1 depicts a block diagram of an example computer system for use in conjunction with one or more embodiments of the present invention.

As discussed briefly above, managing software libraries for software applications has become a major concern because the libraries typically require constant upgrades, both major and minor. Implementing these upgrades is a time-consuming effort for the teams involved because making changes to the software code while upgrading the libraries to the latest version is not only a tedious process, but it typically results in breaking changes and compatibility issues with other libraries. Currently, the only way to identify the latest versions or version compatibility with other libraries is to perform this identification manually by running an internal tool which can review any dependencies that were added, updated, or removed in a pull request made against the default branch of a repository, and flag any changes that would affect the security of the software project.

Accordingly, managing these libraries has become a major concern because the libraries typically require constant upgrades, both major and minor. These upgrades affect the handling of the deprecated code and compatibility with other libraries and are a time-consuming effort for the teams involved. Unfortunately, making changes to the software code while upgrading the libraries to the latest version is a tedious process and typically results in breaking changes and compatibility issues with other libraries.

Currently, the only way to identify the latest versions or version compatibility with other libraries is to perform this identification manually by running an internal tool which can review any dependencies that were added, updated, or removed in a pull request made against the default branch of a repository, and flag any changes that would affect the security of the software project. The tool then sends an alert when a new advisory is added to the Database and flags the package that is insecure. However, the internal tool does not suggest latest versions or updates that are available unless there are vulnerabilities or malware. Moreover, deprecated functions and/or breaking changes in the latest and compatible version of a library are not identified and shown. Thus, vulnerabilities are only shown after a Pull Request (PR) is raised. Furthermore, the only way to update the code with the latest changes is manually.

One or more embodiments of the invention include a system and method that provides for dynamic benchmarking to facilitate a self-managed certification program for library management where the test-operations may be performed to classify the cases based on the influence and impact perceived by the quality of upgrades to be applied. This allows for any intricacies resident within the software application and library dependencies to be apprehended and for any permutations of the library dependencies to drive the outcome based on one or more predetermined metrics, such as recency, stability or feature orientation. One or more embodiments of the invention may forecast upcoming features and associated predicated failures, as well as to build a versioning queue by performing auto adjustments with respect to versions of main and sub libraries.

One or more embodiments use an Artificial Intelligence (AI) model to continuously check for the latest releases libraries and also performs a compatibility check with existing libraries. Furthermore, one or more embodiments apply necessary changes and fixes without compromising on the code quality checks by running Functional Verification Tests (FVT) and regression analysis. The method applies a dynamic benchmarking approach to facilitate a self-management certification for library management. This dynamic benchmarking approach objectively analyses the strengths and weaknesses of the libraries, as well as conduct an analysis on the activity of the libraries. One or more embodiments also perform test operations on the libraries to classify the upgrades based on the influence and impact perceived by the quality of the upgrades. One or more embodiments apprehend or capture intricacies within application and library dependencies and recommends permutations of dependencies to drive different outcomes based on recency, stability and/or feature orientation. Additionally, embodiments allow for the system to be 'informed' about upcoming features and associated predicated failures, as well as to build a versioning queue by performing automatic adjustments with respect to version of main and sub libraries.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s) 101). The processors 101 may include one or more processors which can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110 and may include a software library module 153. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of one or more processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
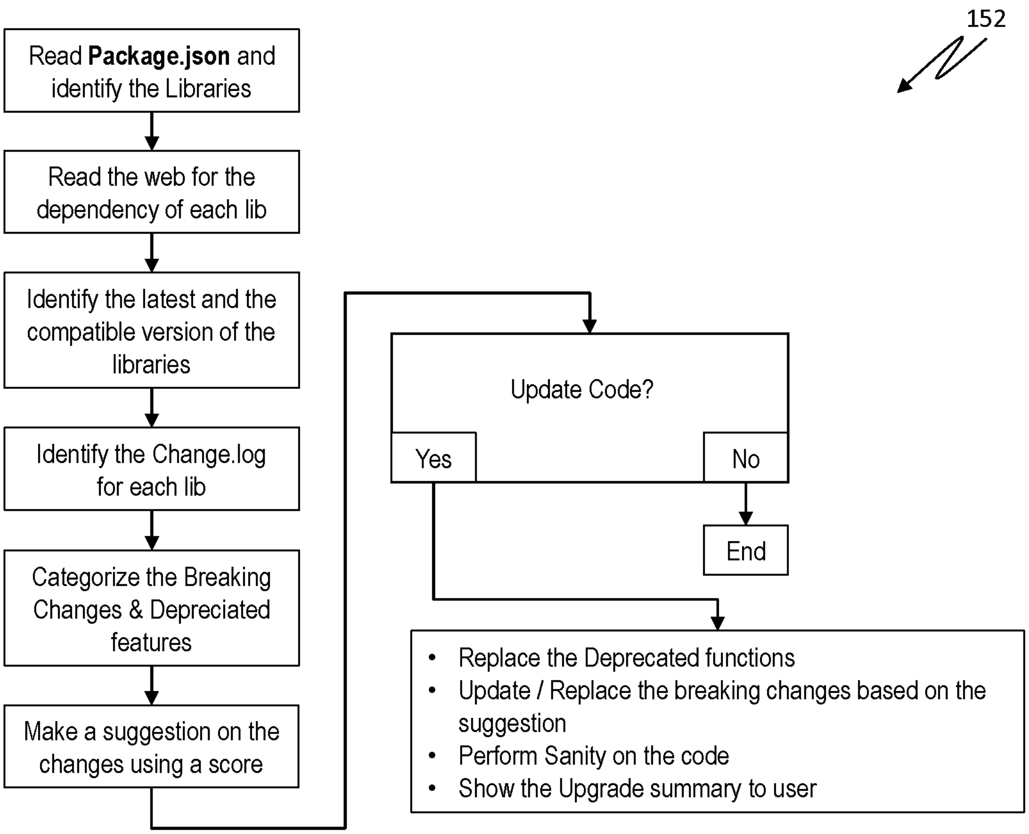
FIG. 2 depicts a flowchart illustrating an overall method for supporting self-assessed upgrades using dynamic benchmarking of possible combinations of main and sub libraries for carrying out Library Developer Operations (LibOps), according to one or more embodiments of the present invention.
Figure 3:
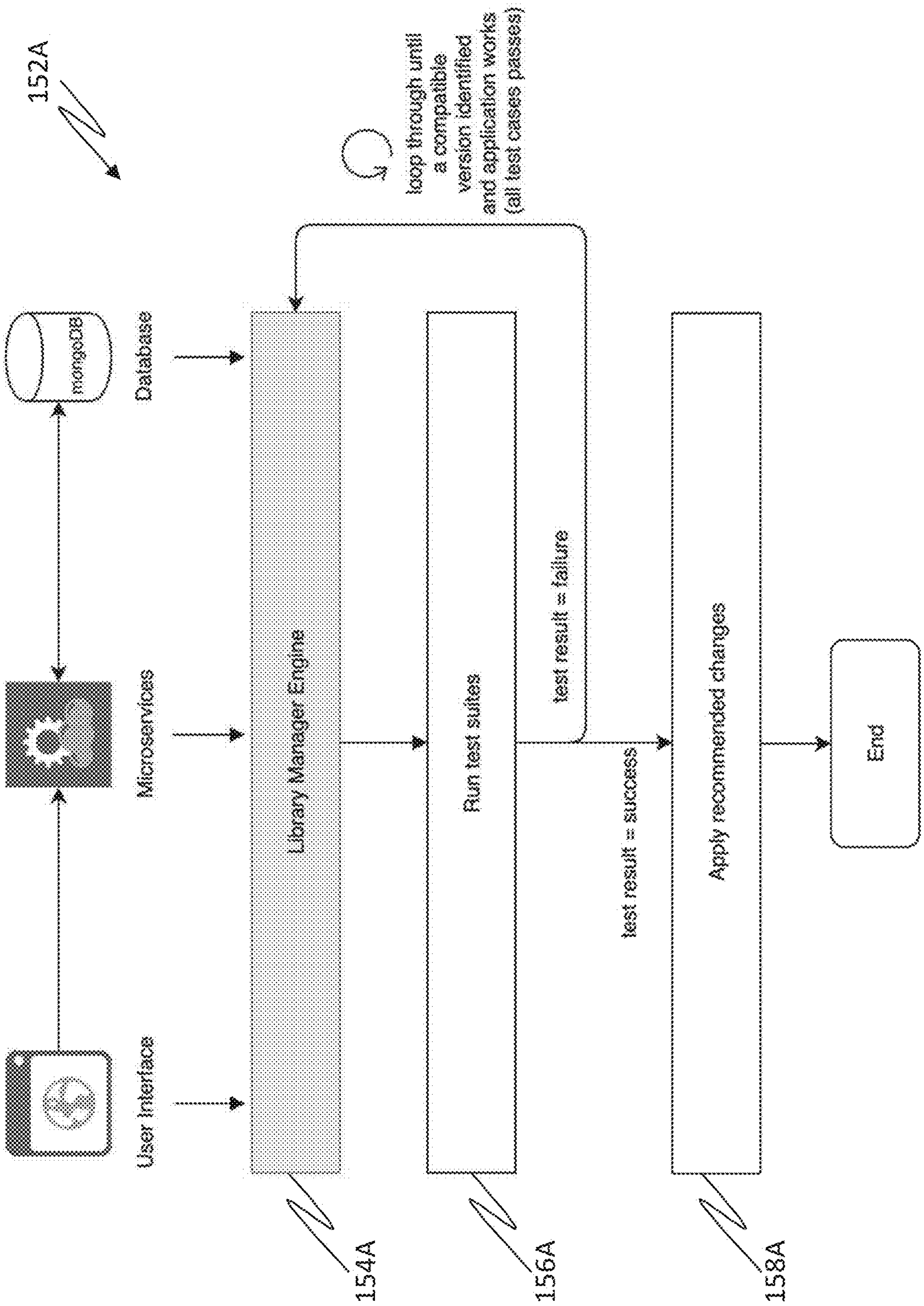
FIG. 3 is a graphical flowchart illustrating a high-level method for identifying version compatibility, according to one or more embodiments of the present invention.
Figure 4:
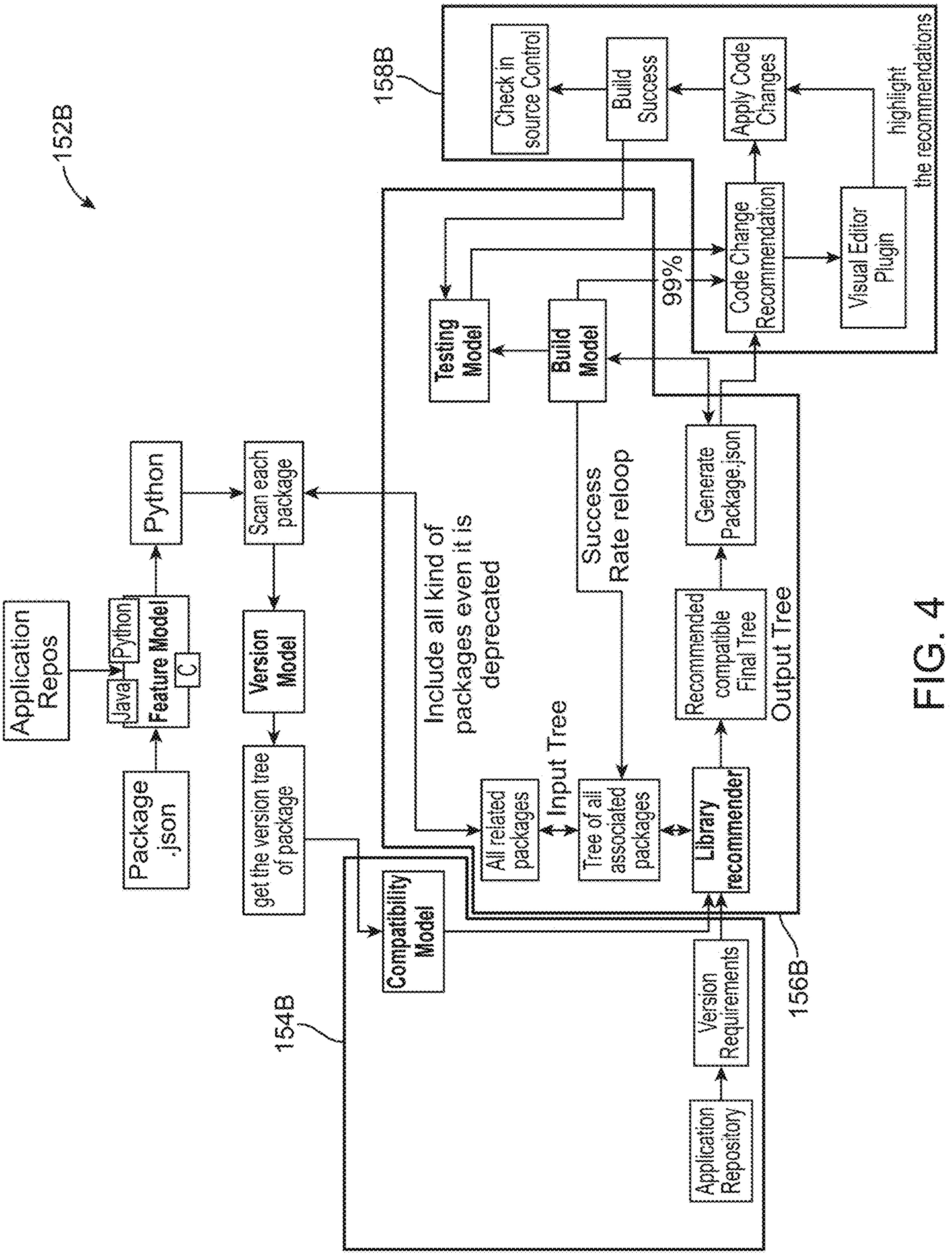
FIG. 4 is a flowchart illustrating an overall method for supporting self-assessed upgrades using dynamic benchmarking of possible combinations of main and sub libraries for carrying out Library Developer Operations (LibOps), in accordance with one or more embodiments of the present invention.

Referring to FIG. 2, FIG. 3 and FIG. 4, shown are flow charts illustrating embodiments of the invention which include identifying if there are library patches or other upgrades for a project to be updated and determining the project information by examining the Package.json module. Referring to FIG. 3, a high-level block diagram 152A illustrating an embodiment where a version of a software library (in MongoDB) contained in the software library module 153 that is compatible with recommended upgrades is being identified is shown. In this embodiment, application software libraries are identified 154A and tested 156A with respect to recommended upgrades using predetermined test suites to determine if an identified version of the application software library is compatible with the recommended upgrades. If the identified version of the application software library is not compatible with the recommended upgrades, then the other identified versions of the application software library is compatible with the recommended upgrades. This process is repeated until a version of the application software library that is compatible with the recommended upgrades is identified. When a version of the application software library that is compatible with the recommended upgrades is identified, then recommended upgrades to the compatible version of the application software library is generated and the upgrades are applied 158A to compatible version of the application software library.

Figure 5A:
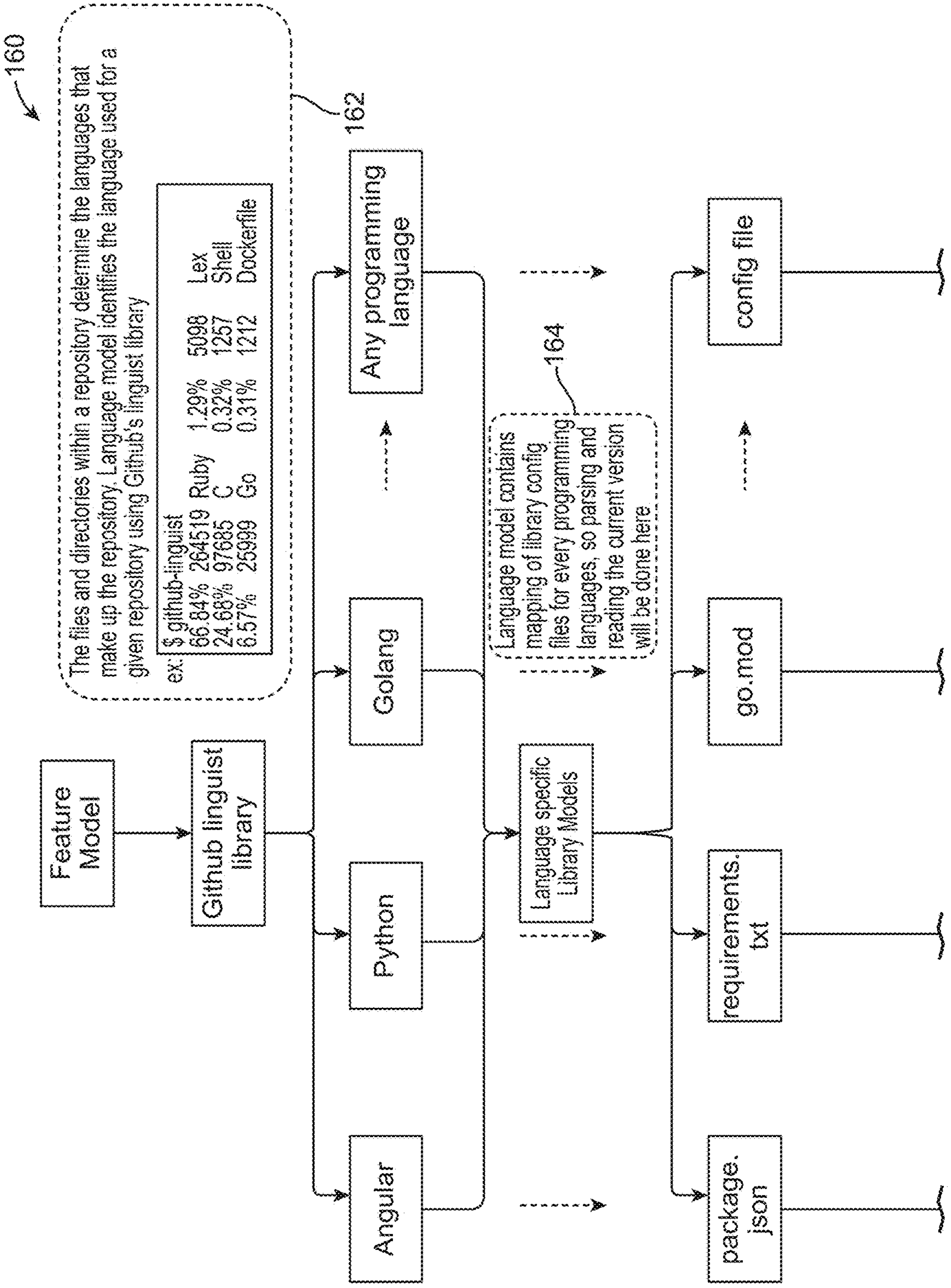
FIG. 5A is a flowchart illustrating a method for identifying the dependency for each of the relevant libraries for a software project, in accordance with one or more embodiments of the present invention.
Figure 5B:
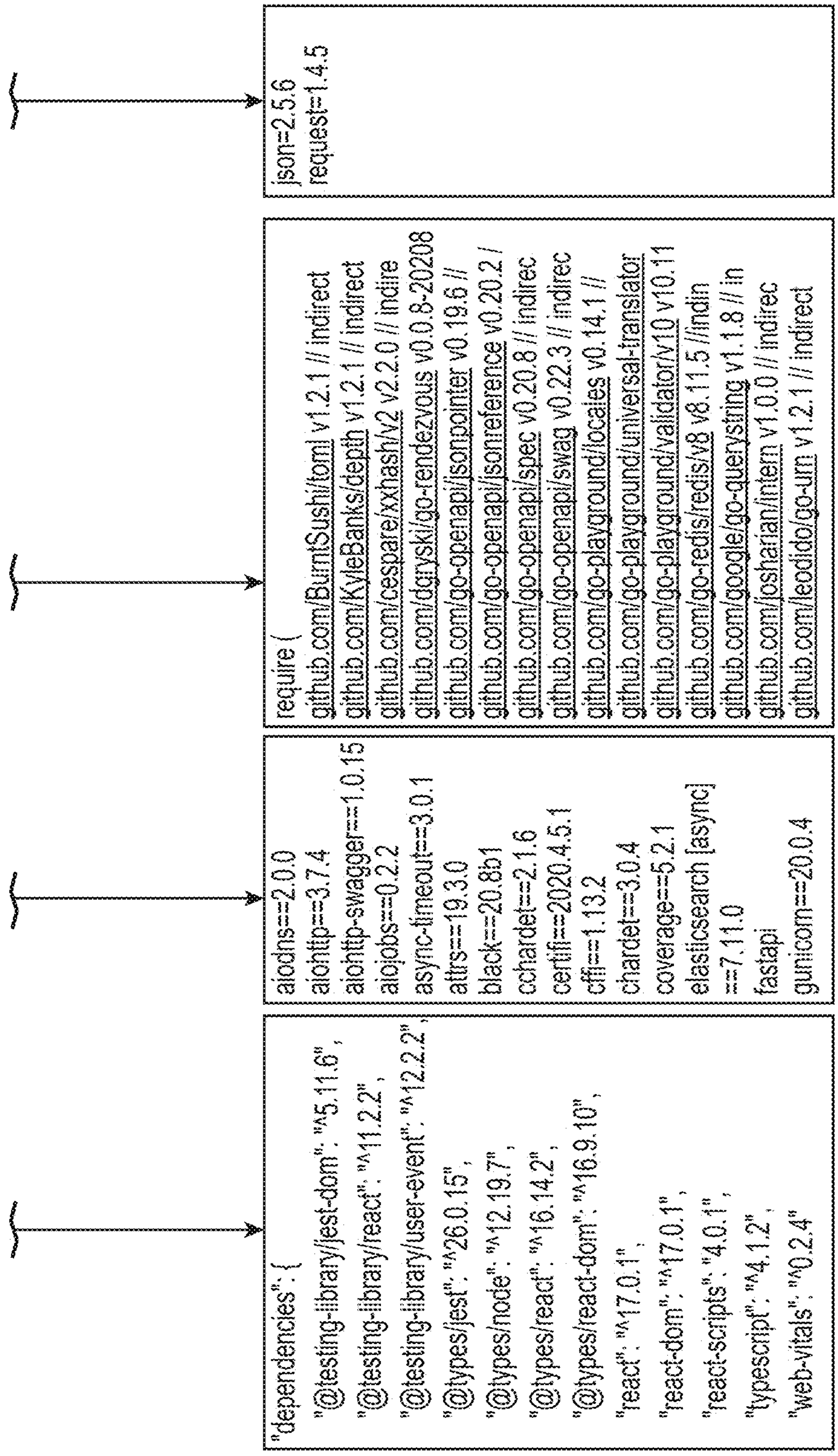
FIG. 5B is a continuation of the flowchart of FIG. 5A illustrating a method for identifying the dependency for each of the relevant libraries for a software project, in accordance with one or more embodiments of the present invention.

Referring to FIG. 4, a high-level block diagram 152B illustrating an embodiment where a version of a software library (in Python) that is compatible with recommended upgrades is being identified is shown. In this embodiment, application software libraries are identified 154B and tested 156B with respect to recommended upgrades using predetermined test suites to determine if an identified version of the application software library is compatible with the recommended upgrades. If the identified version of the application software library is not compatible with the recommended upgrades, then the other identified versions of the application software library is compatible with the recommended upgrades. This process is repeated until a version of the application software library that is compatible with the recommended upgrades is identified. When a version of the application software library that is compatible with the recommended upgrades is identified, then recommended upgrades to the compatible version of the application software library is generated and the upgrades are applied 158B to compatible version of the application software library Referring to FIGS. 5A and 5B, a flow chart 160 is shown illustrating an embodiment of the invention for identifying the dependency for each of the relevant libraries for the project and identifying the latest and most compatible versions of the project libraries by conducting a specific library assessment. This may be accomplished by assessing the library content and by searching the web for the most relevant information. As shown, a data repository for the software application is examined 162 to identify which languages (Angular, Python, Golang, . . . , etc.) make up the repository. For each of the languages that make up the repository, the invention accesses the language model and generates 164 a package.json file containing important information about the project, a requirement.txt file containing a list of packages or libraries needed to work on the project, a go.mod file containing specific versions of the dependencies used by the project and a config file which help to define how a user interacts with the project.

Figure 6A:
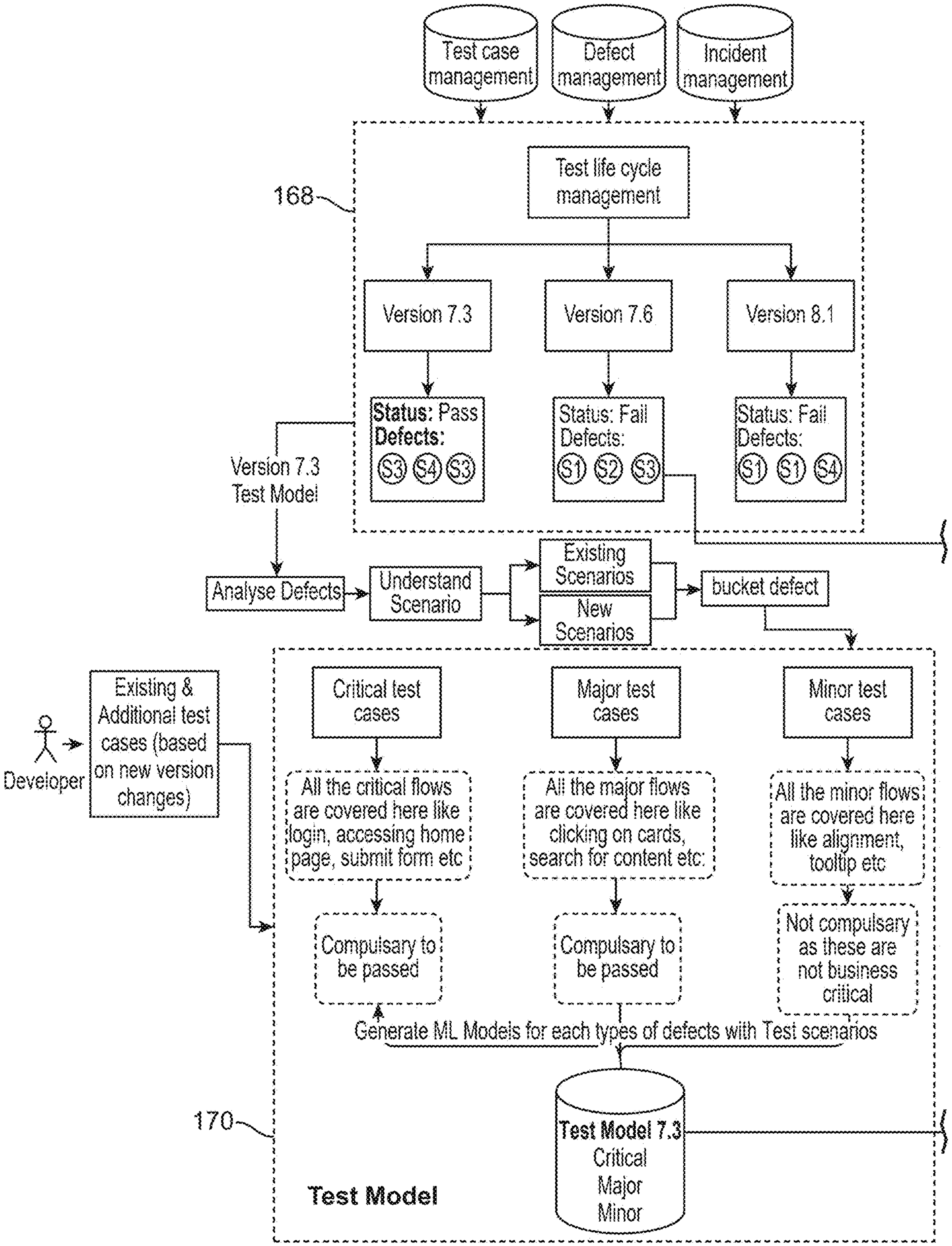
FIG. 6A is a flowchart illustrating a method for testing an assessment of the relevant libraries to identify whether any of the upgrades will generate any critical, major or minor failures/issues, according to one or more embodiments of the present invention.
Figure 6B:
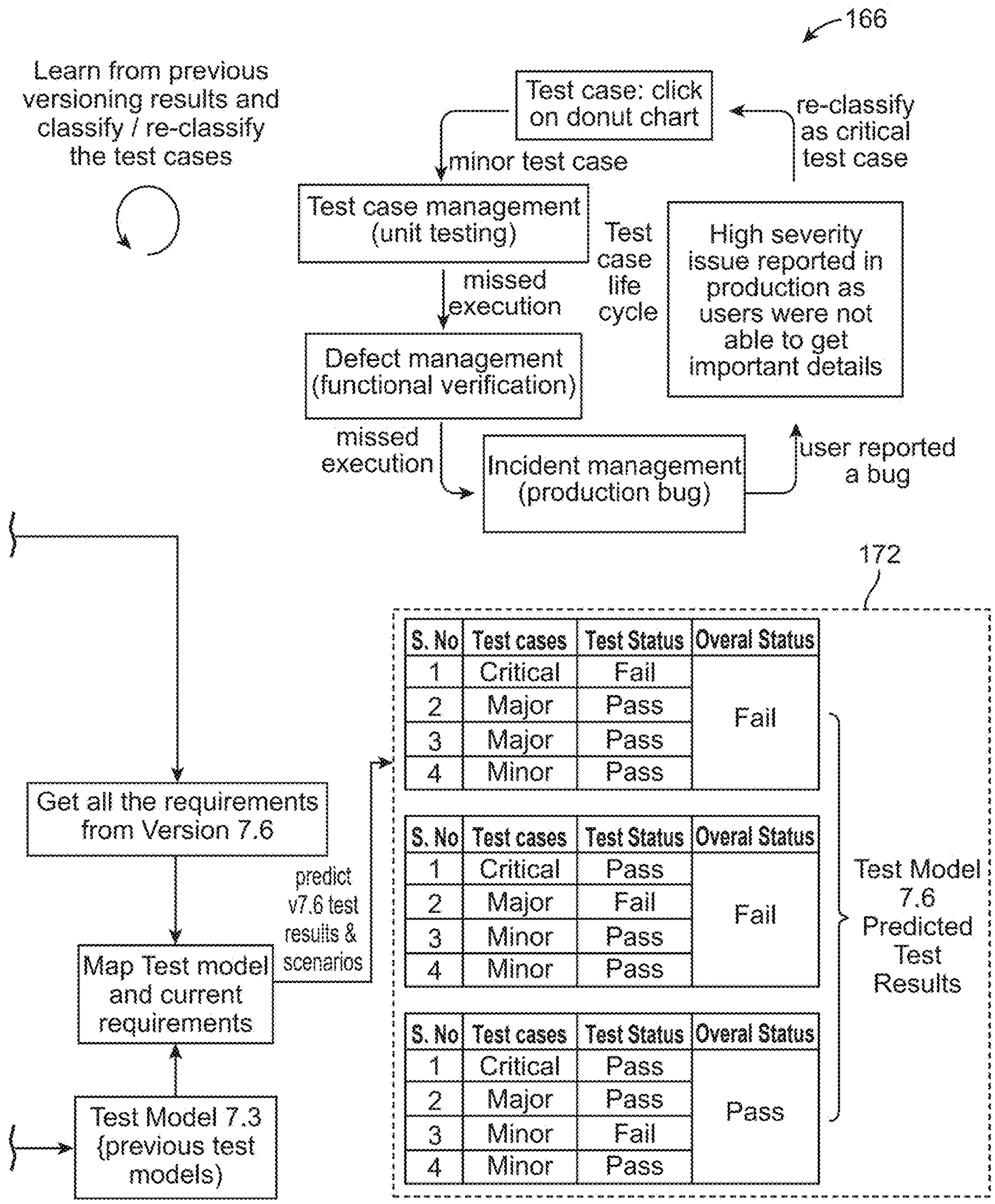
FIG. 6B is a continuation of the flowchart of FIG. 6A illustrating a method for testing an assessment of the relevant libraries to identify whether any of the upgrades will generate any critical, major or minor failures/issues, according to one or more embodiments of the present invention.

Referring to FIGS. 6A and 6B, a flow chart 166 is shown illustrating an embodiment where the assessment may be tested to identify whether any of the upgrades will generate any critical, major or minor failures/issues. This may be accomplished by testing the upgrades using specific test cases to identify possible issues. For example, multiple versions of the software application libraries are identified and tested with respect to the recommended upgrades 168 to access the identified passing version. The version of the software application library that passes is then analyzed to identify any defects and the defects are then examined with respect to existing scenarios and any possible new scenarios. The results of this examination are then tested 170 using a predefined test model to identify any critical test issues, major test issues and minor test issues. If there are any critical test issues and/or major test issues identified, then the version is not compatible and the process needs to be repeated with a different version. However, if there are no issues or only minor test issues, then the version passes the testing and version requirements from any newer versions are integrated with the passing version and the test results are examined to generate predicted test results 172.

Figure 7A:
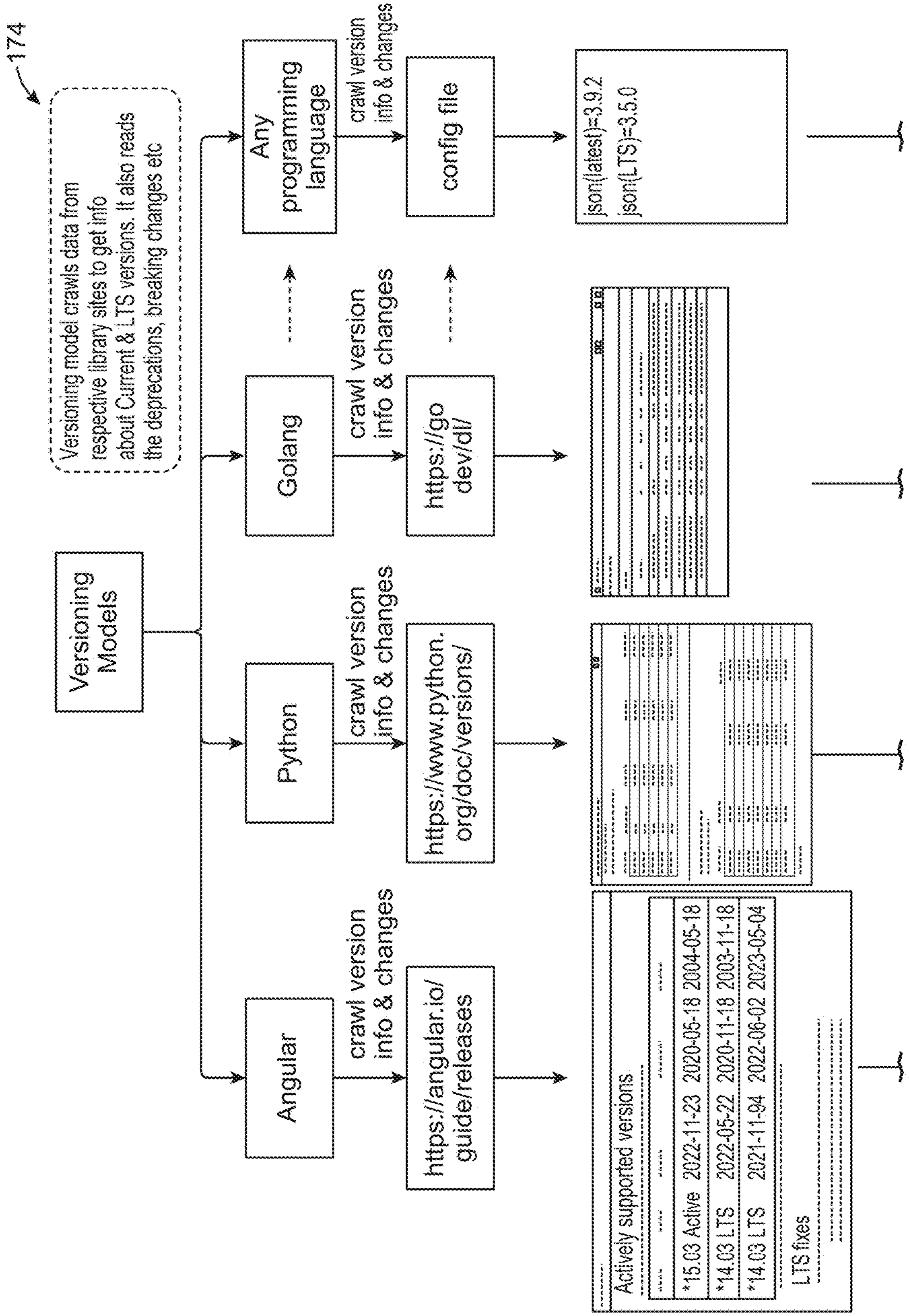
FIG. 7A is a flowchart of a method for assessing versions of an upgrade to identify current and Long Term Support (LTS) versions along with the read deprecations and breaking changes for various software applications, according to one or more embodiments of the present invention.
Figure 7B:
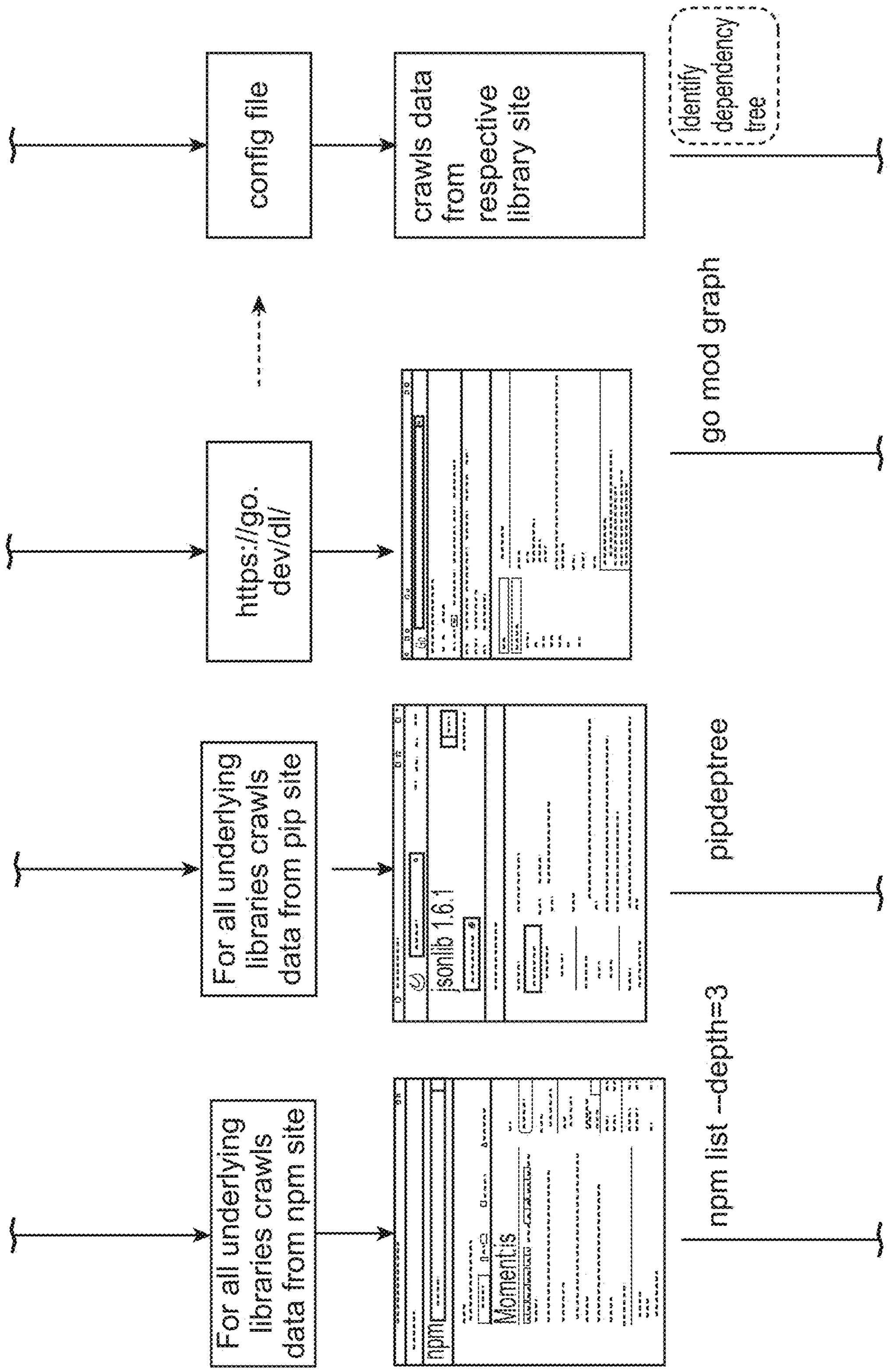
FIG. 7B is a continuation of the flowchart of FIG. 7A illustrating a method for assessing versions of an upgrade to identify current and Long Term Support (LTS) versions along with the read deprecations and breaking changes for various software applications, according to one or more embodiments of the present invention.
Figure 7C:
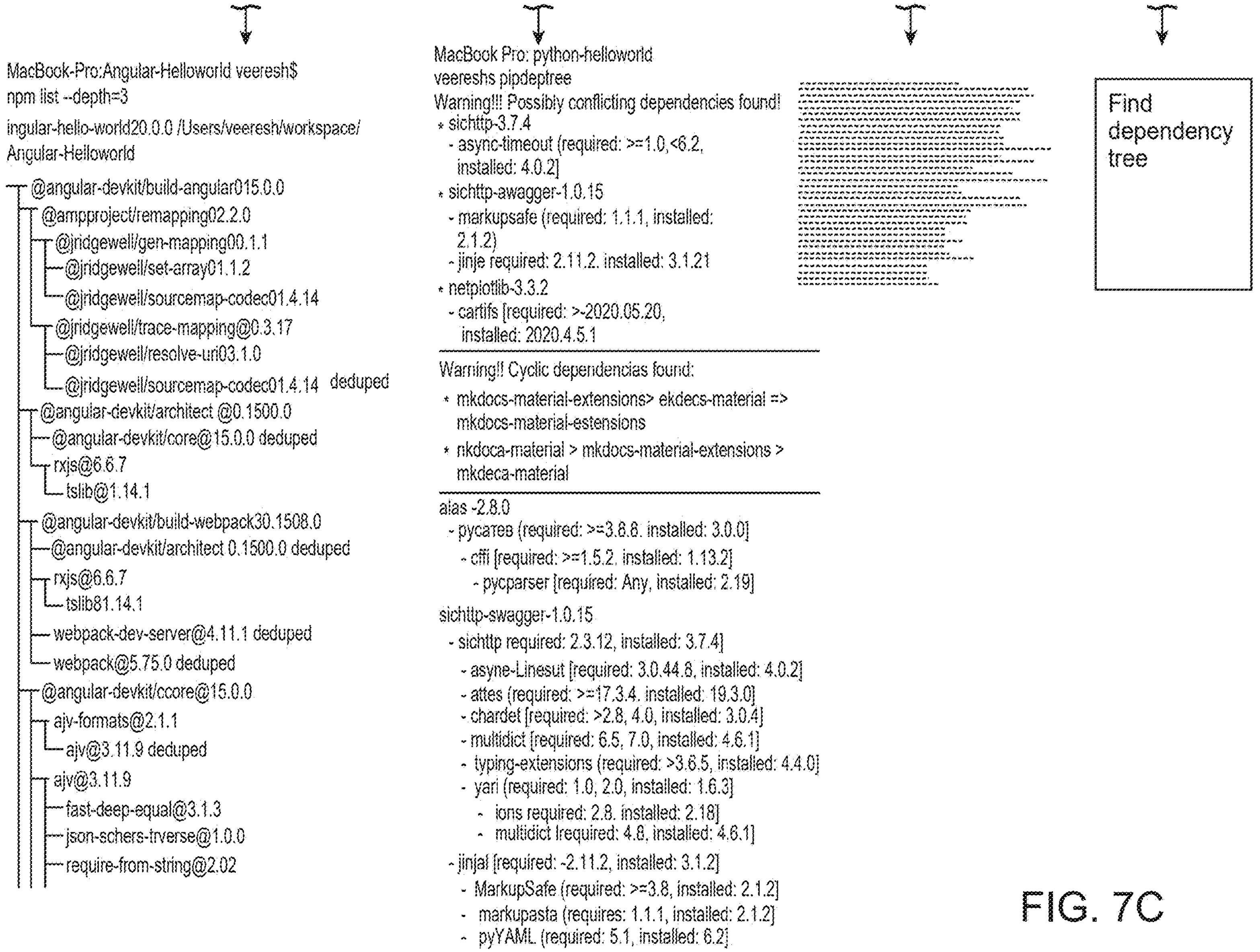
FIG. 7C is a continuation of the flowchart of FIG. 7A and FIG. 7B illustrating a method for assessing versions of an upgrade to identify current and Long Term Support (LTS) versions along with the read deprecations and breaking changes for various software applications, according to one or more embodiments of the present invention.
Figure 8:
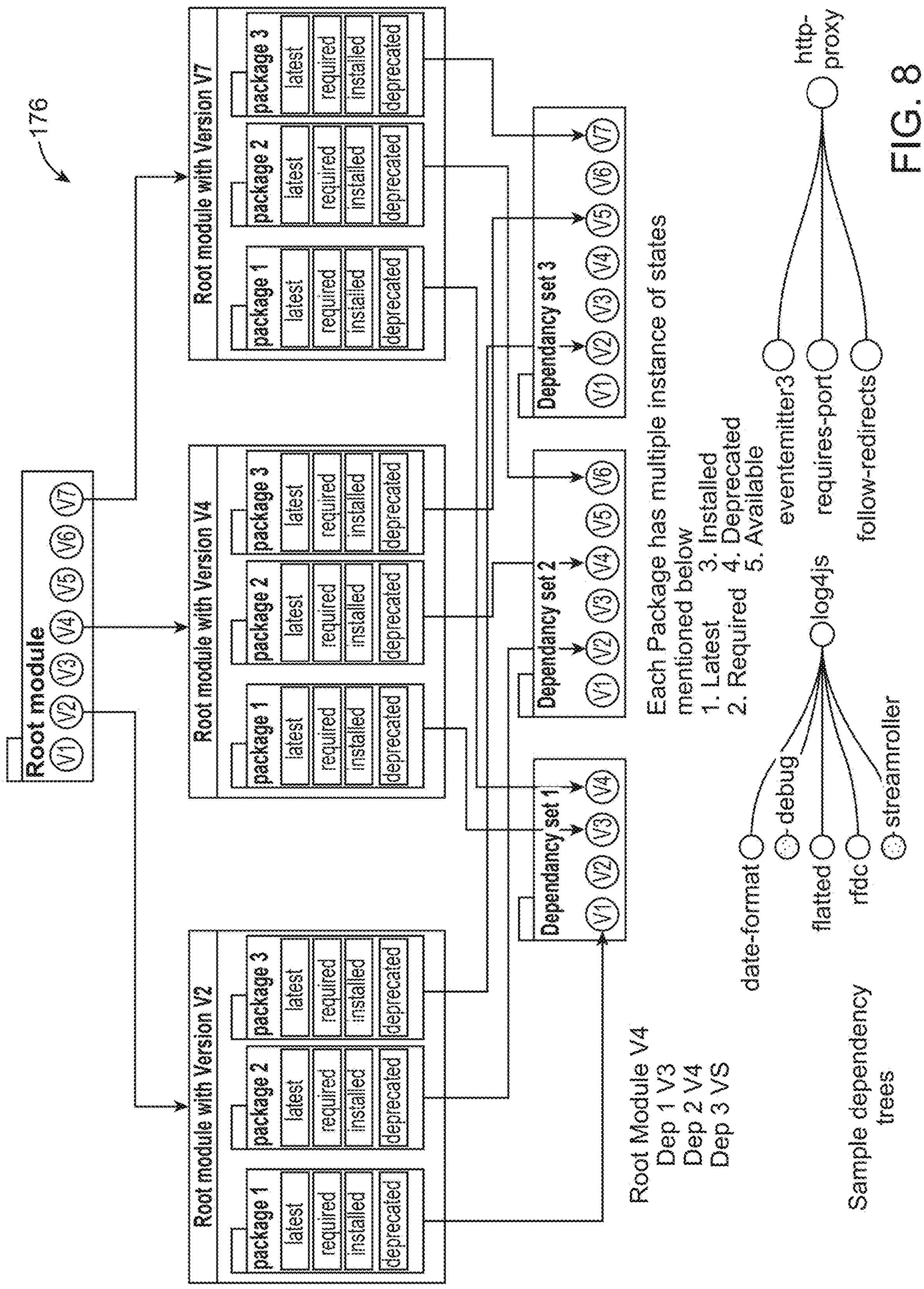
FIG. 8 is a flowchart identifying dependencies for various library versions including sample dependency trees, according to one or more embodiments of the present invention.

Additionally, referring to FIGS. 7A, 7B, and 7C, a flow chart 174 illustrating an embodiment which may include implementing a versioning model which interacts with multiple software application language library sites (Angular, Python, Golang, etc.) to obtain information regarding current and Long Term Support (LTS) versions and any deprecations, breaking changes, etc. FIG. 8 is a block diagram 176 illustrating dependency trees for the above.

Referring to FIGS. 9A1 and 9A2, a flow chart 178 illustrating an embodiment for conducting a versioning model is shown and includes obtaining information regarding the repository and the software package, including all available versions. This information is then used to create all possible combinations of versions from root to leaf and a bucket tree is generated for each of the combinations, where each bucket mimics the combinations of versions for each layer of the topology tree. The state of each of each version of dependencies is checked to determine if any include deprecations, where any bucket including deprecations will not be recommended and buckets without deprecations will be recommended. Recommended buckets that include requirements that matches requirements for the versions of the application software that are compatible with the upgrades are then updated with the compatible versions of the software application and 1) the versions are updated in the application repository, and 2) the build scripts and the requirements.txt files are updated. A test model is then built and tested, wherein if the test model passes the test, the upgrades are deployed into the software application.

FIGS. 9B1, 9B2, and 9B3 depict a flow chart 180 illustrating one version of a dependency versioning workflow model which may be developed to verify the versioning assessment. In this embodiment, from the information located in the application repository a dependency map containing the dependencies and current state for all of the possible versions of each package, wherein each packages may have multiple states (Latest, Required, Installed, Deprecated, Available). Additionally, the module/repository/package index repository is examined and with the information contained therein all versioning possibilities are generated. Using the dependency map, all possible combinations of package buckets that holds each type of package and version is generated. All packages with the predicted compatible versions and their respective scripts and features are obtained and using this information, a next versioning change is predicted and displayed to a user and a build process standby is enabled. Moreover, using all of the combinations of package buckets and versioning possibilities along with any build issues, deployment issues, library changes and application support tickets, a test model is generated and tested using a compatibility test model engine and compatibility versioning changes are predicted and applied to the generation of all possible combination of package buckets.

Figure 10A:
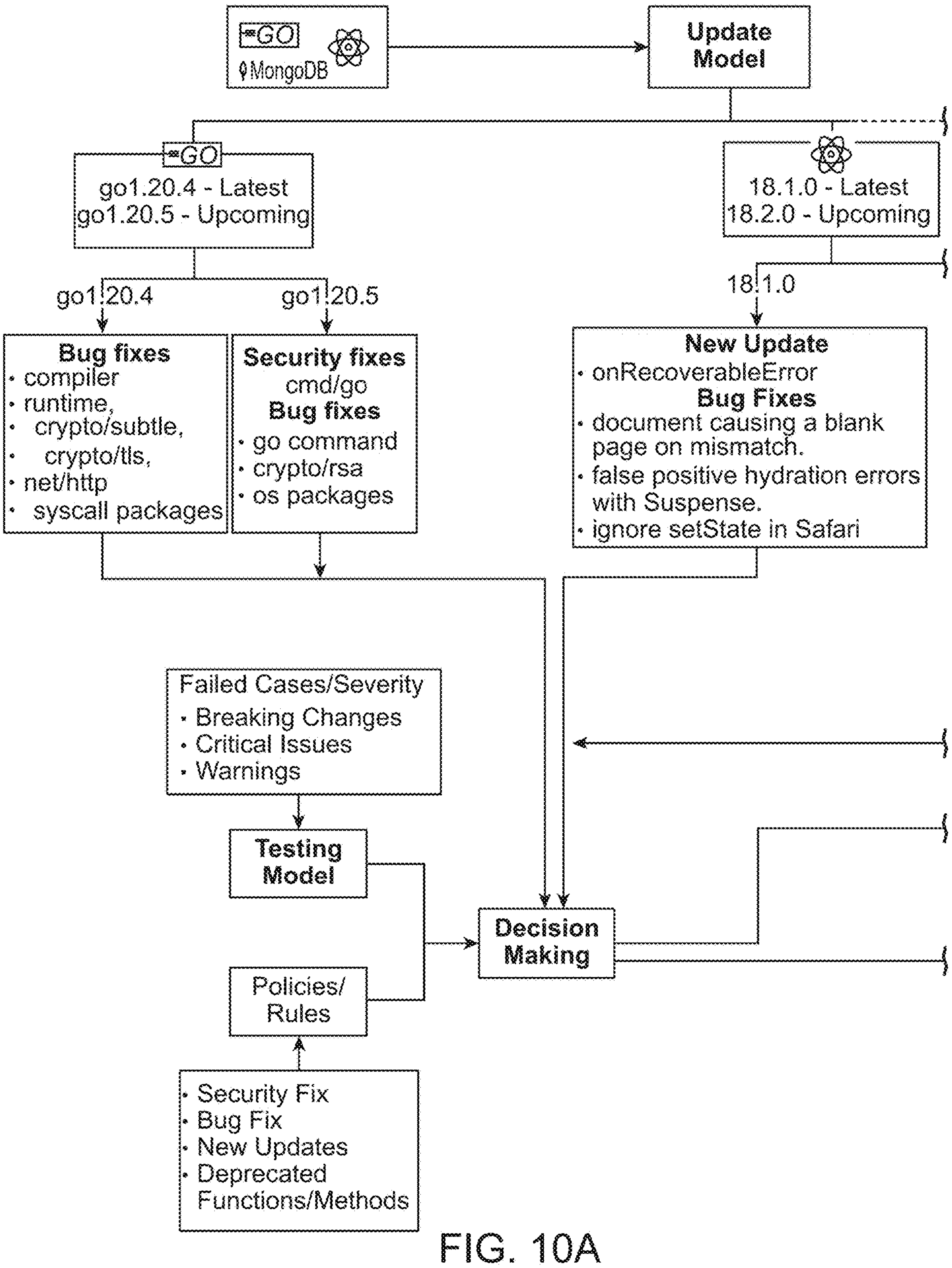
FIG. 10A is a flowchart illustrating a method for identifying the change.log for each of the relevant libraries, according to one or more embodiments of the present invention.
Figure 10B:
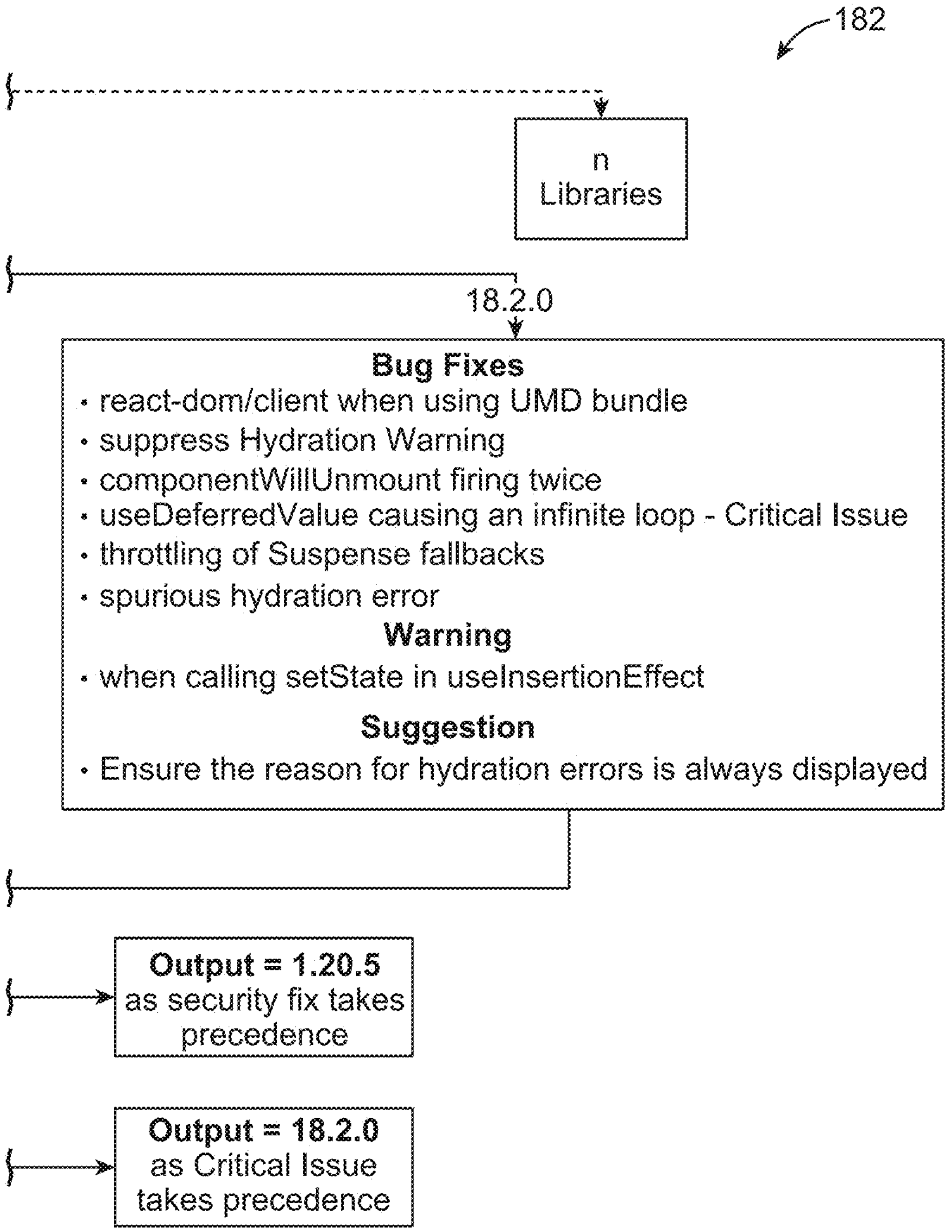
FIG. 10B is a continuation of the flowchart of FIG. 10A illustrating a method for identifying the change.log for each of the relevant libraries, according to one or more embodiments of the present invention.

FIGS. 10A and 10B depict a flow chart 182 which illustrates an embodiment for identifying the change.log for each of the relevant libraries, wherein the change.log module typically includes a record of all of the changes to the libraries, such as bug fixes, features, etc. Breaking changes and deprecated features are identified and categorized and suggestions on how to implement the changes are processed to generate an upgrade score.

Figure 11:
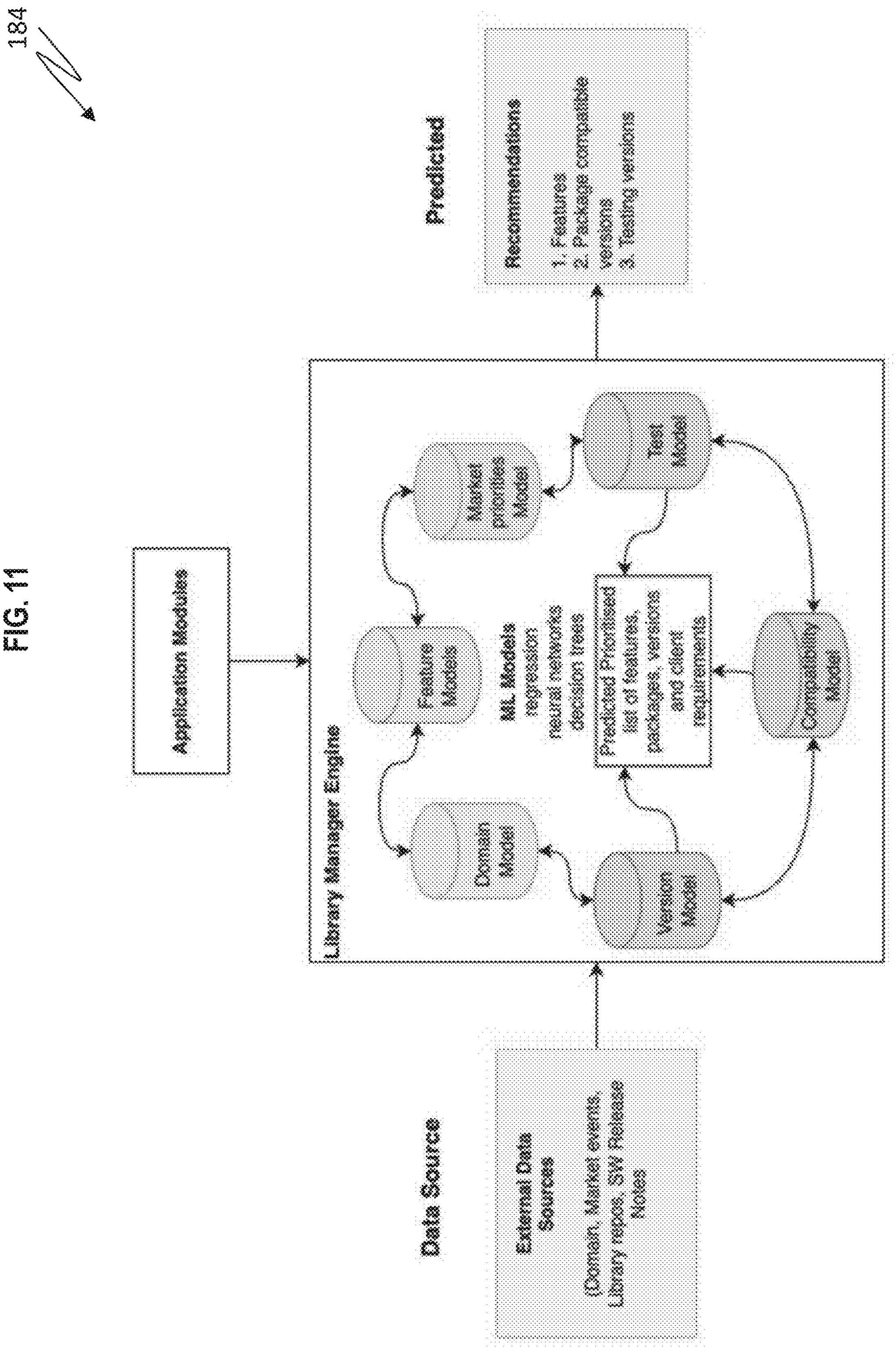
FIG. 11 is a flowchart of a method for determining if relevant libraries require an update to the code and suggesting recommendations, according to one or more embodiments of the present invention.

FIG. 11 depicts a graphical block diagram 184 illustrating an embodiment of an overall approach for determining if the relevant libraries require an update to the code and if so, suggest recommendations. If there is no update required to the library code for any of the relevant libraries, then the method terminates until reimplemented. If one or more of the relevant libraries require update to the library code, then the deprecated functions are replaced, the breaking changes are updated/replaced responsive to the upgrade score. The code may be examined, tested and evaluated for any conflict and/or other issues that may foreseeably arise due to the update of the code. If the evaluation of the code changes determines that issues will arise by implementing the upgrades, then the evaluation will suggest recommendations.

Figure 12:
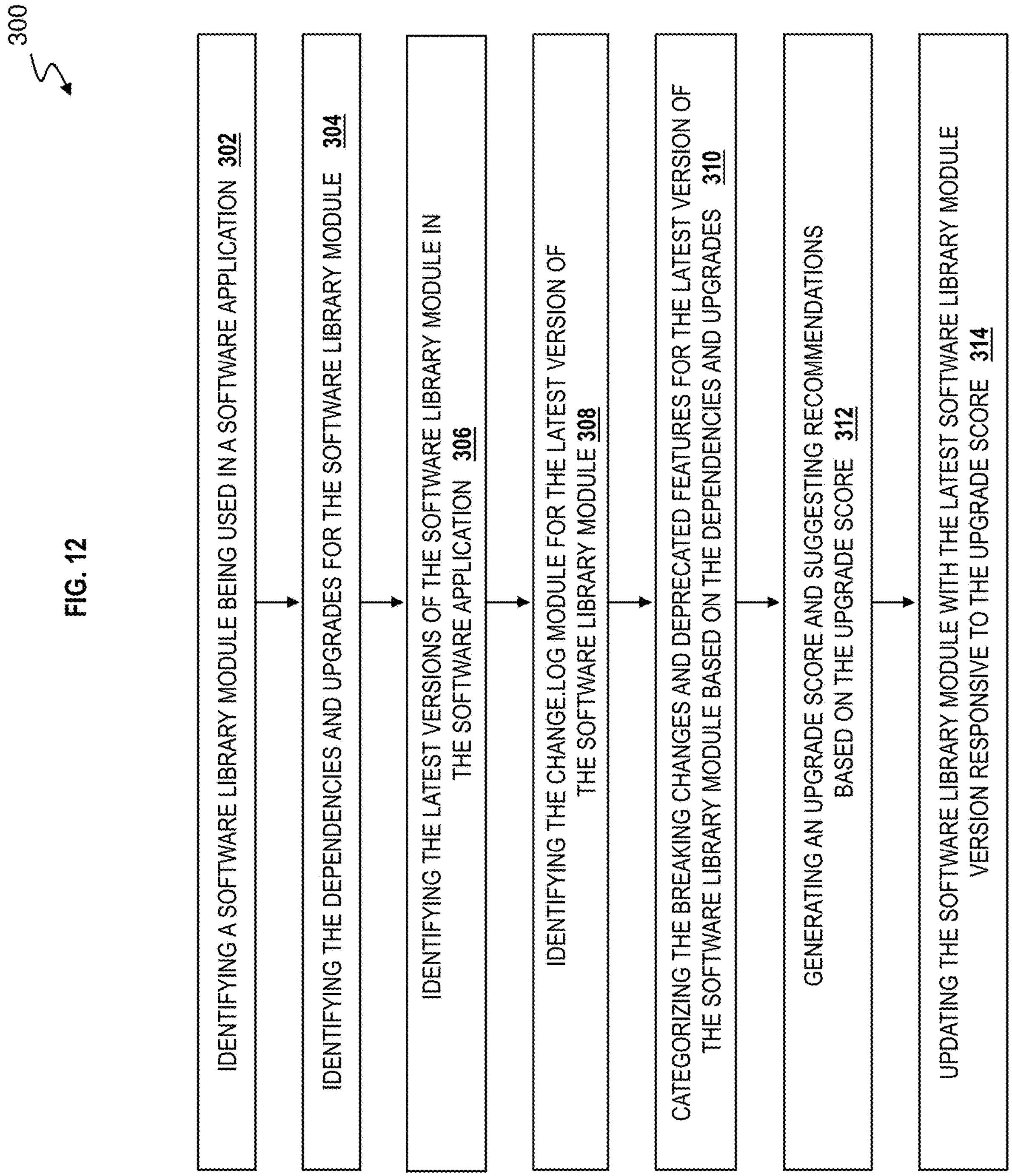
FIG. 12 is a block diagram of a method for supporting self-assessed upgrades using dynamic benchmarking of possible combinations of main and sub libraries for carrying out Library Developer Operations (LibOps), according to one or more embodiments of the present invention.

In accordance with an embodiment, a method 300 for supporting self-assessed upgrades using dynamic benchmarking of possible combinations of main and sub libraries for carrying out Library Developer Operations (LibOps) is a computer implemented method and is provided and executed or caused to be executed by software 111 of the computer system 100, as shown in FIG. 12, wherein the method is carried out on a developers system using a copy of the user's software prior to the installation of library and other LibOps update onto the user's software. In this way, the method 300 ensures that the installation of the updates to the libraries and other LibOps will not cause a loss of functionality due to incompatibilities with the updates and the user's system. The method 300 includes identifying relevant libraries for a software project, as shown in operational block 302. This may be accomplished by reading the Package.json module to determine project information and which libraries are relevant to the software project. The method 300 includes identifying the dependency for each of the relevant libraries for the software project, as shown in operational block 304. This may be accomplished by searching the web for information related to the relevant libraries.

The method 300 further includes identifying the latest and most compatible versions of the software project libraries and assessing library content by conducting a specific library assessment, as shown in operational block 306. This may be accomplished by performing an assessment of the content of the software project libraries. The change.log module for each of the software project libraries are identified, as shown in operational block 308, and the breaking changes and deprecated features are categorized, as shown in operational block 310. The method 300 includes determining if the relevant software project libraries require an update to the code and if so, generating an upgrade score and suggesting recommendations based on the upgrade score, as shown in operational block 312. If there are no upgrades required to the library code for any of the relevant software project libraries, then the method terminates until reimplemented. If one or more of the relevant libraries require update to the library code, the method includes updating the software library module with the latest software library module version responsive to the upgrade score, as shown in operational block 314. This may be accomplished by replacing the deprecated functions and updating/replacing the breaking changes responsive to the update score. The code may be examined, tested and evaluated for any conflict and/or other issues that may foreseeably arise due to the update of the code. If the evaluation of the code changes determines that issues will arise by implementing the upgrades, then the evaluation will suggest recommendations.

In an embodiment, upon receiving a recommendation to update/change/upgrade one or more libraries or LibOps of user software located on a user's computer system, thereby improving the operation of the user's computer system, the method of one or more embodiments is implemented on a developer system which is operating a mirror version of the user software with software libraries and other LibOps in a parallel fashion. The developer system implements the method 300 to ensure that there is no interruption in the operation of the user software to be updated, to ensure that any issues that may exist with the updates are corrected prior to being installed on the user software to be updated and to ensure that the installation of updates occurs seamlessly to a user. Upon confirmation from the developer system that the updates will not cause an interruption of operation of the user software to be updated, the developer system will automatically install the updates into the user software to be updated. It is noted that upgrade to the software libraries are technically beneficial for several reasons, including application of security patches to reduce vulnerabilities and to defend against cyberattack, early identification of deprecated functionality, application of fixes for known bugs in the library by having the latest versions of the libraries or software and adoption of new functionality, as well adopting an upgraded look and feel. All of these reasons act to boost performance of the software of the user's computer system by providing software operational stability, compatibility and security.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
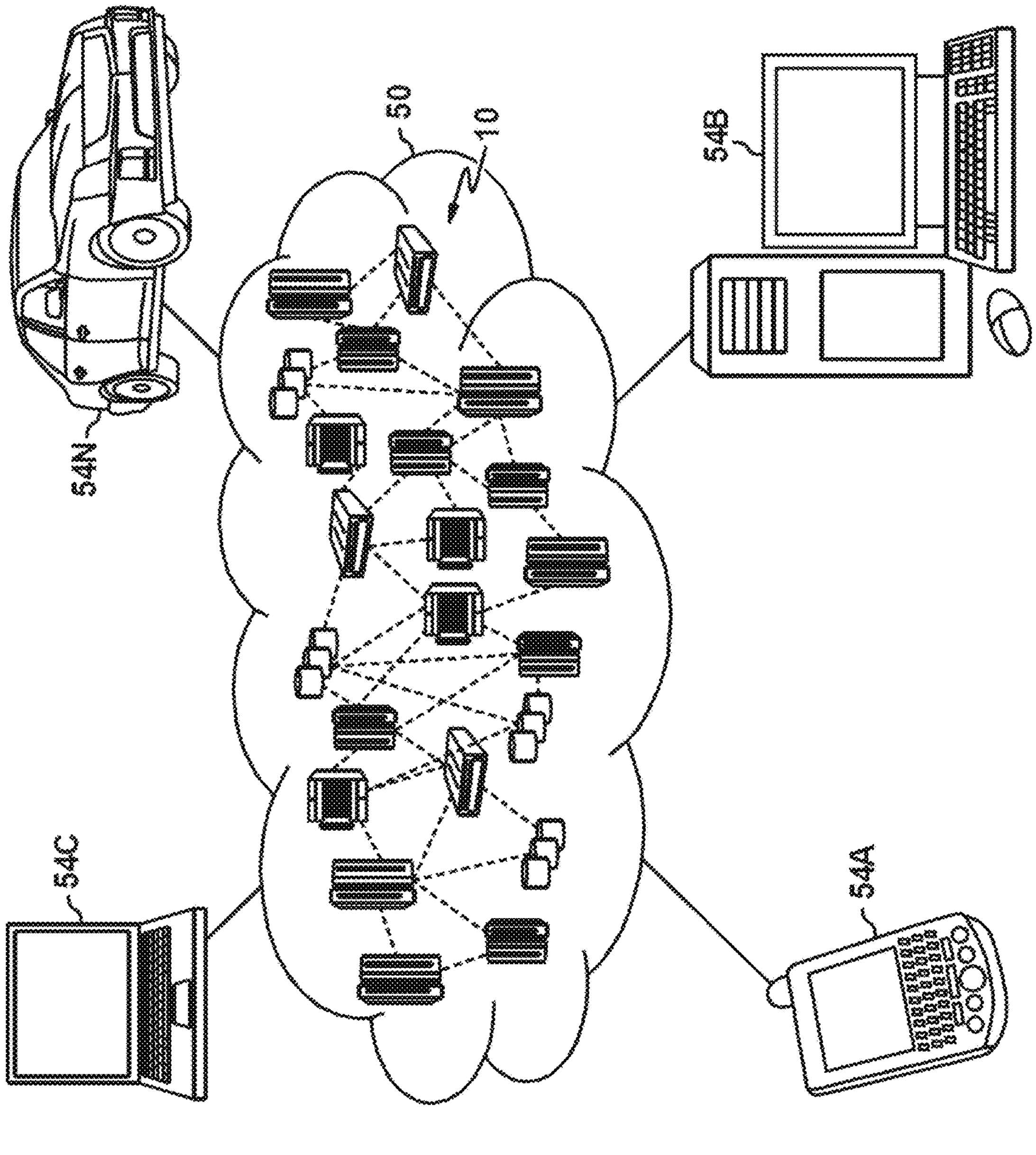
FIG. 13 depicts a cloud computing environment according to one or more embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
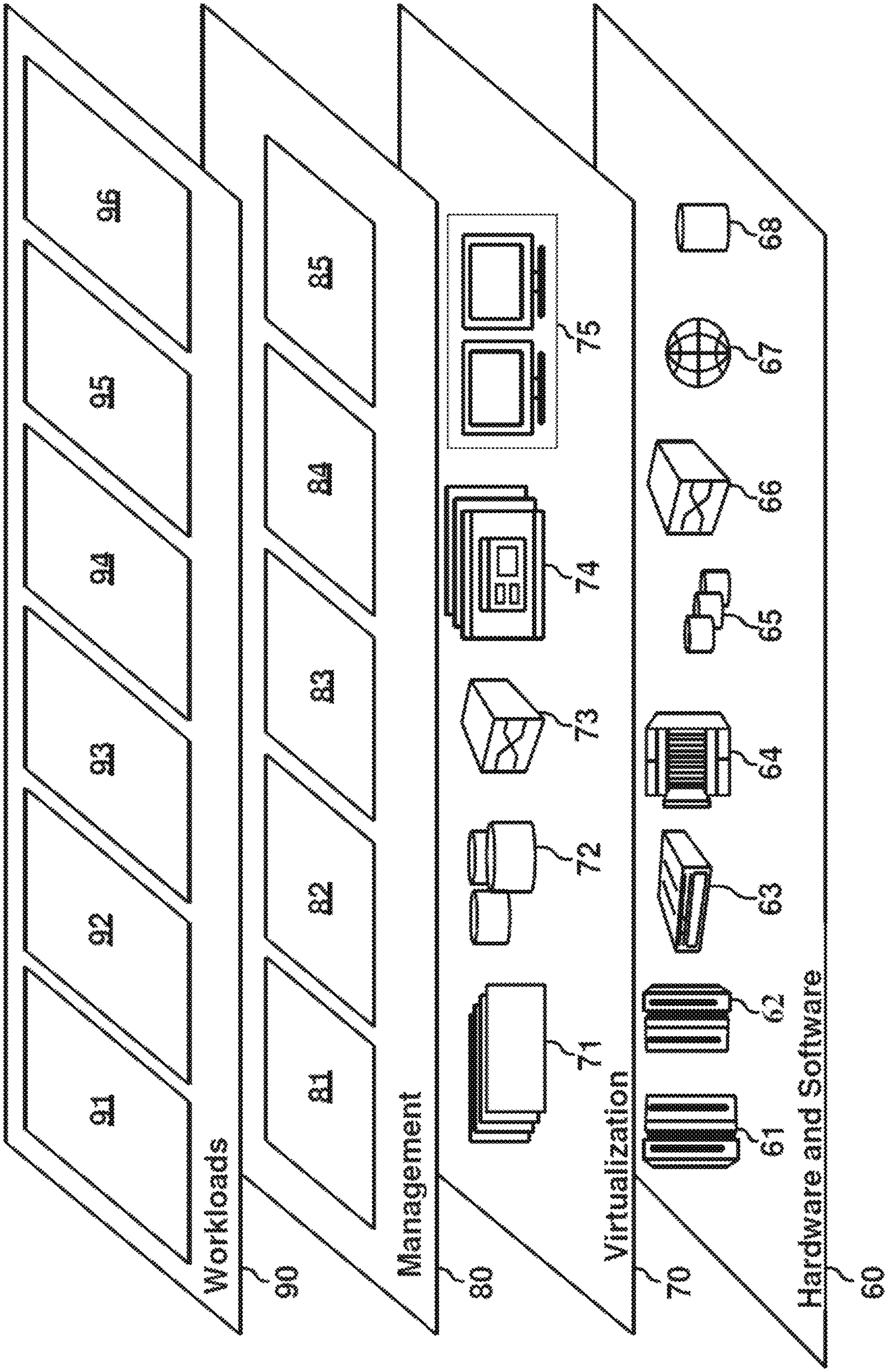
FIG. 14 depicts abstraction model layers according to one or more embodiments of the present invention.

Referring now to FIG. 14, a set of functional abstraction layers provided by cloud computing environment 50 (depicted in FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term “coupled” describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms “comprises,” “comprising,” “includes,” “including,” “has,” “having,” “contains” or “containing,” or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term “exemplary” is used herein to mean “serving as an example, instance or illustration.” Any embodiment or design described herein as “exemplary” is not necessarily to be construed as preferred or advantageous over other embodiments or designs. The terms “at least one” and “one or more” are understood to include any integer number greater than or equal to one, i.e., one, two, three, four, etc. The terms “a plurality” are understood to include any integer number greater than or equal to two, i.e., two, three, four, five, etc. The term “connection” can include both an indirect “connection” and a direct “connection.”

The terms “about,” “substantially,” “approximately,” and variations thereof, are intended to include the degree of error associated with measurement of the particular quantity based upon the equipment available at the time of filing the application. For example, “about” can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the “C” programming language or similar programming languages. The computer readable program instructions may execute entirely on the user’s computer, partly on the user’s computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable program instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer implemented method for supporting self-assessed upgrades using dynamic benchmarking of combinations of main and sub libraries for carrying out Library Developer Operations (LibOps), the method comprising:

identifying a software library module being used in a software application;

identifying dependencies and upgrades for the software library module;

identifying a latest software library module version;

identifying a change.log module for the latest software library module version, wherein the change.log module includes a record of all changes to the software library module;

categorizing breaking changes and deprecated features for the latest software library module version;

generating an upgrade score responsive to a quality of the upgrades and suggesting recommendations responsive to the upgrade score, and updating the software library module with the latest software library module version responsive to the upgrade score, wherein generating the upgrade score includes processing the categorized breaking changes and deprecated features for the latest software library module version.

2. The computer implemented method of claim 1, further includes identifying if there are library patches or other upgrades for the software library module, and conducting a specific library assessment to determine the dependencies.

3. The computer implemented method of claim 2, further including examining a Package.json module the software application to determine project information.

4. The computer implemented method of claim 1, further performing test operations on the libraries to classify the upgrades based on the quality of the upgrades.

5. The computer implemented method of claim 4, wherein conducting the specific library assessment includes assessing library content and searching websites for relevant information regarding the library content.

6. The computer implemented method of claim 5, wherein conducting the specific library assessment includes testing the specific library assessment to determine if the upgrades will generate any critical, major or minor issues.

7. The computer implemented method of claim 1, wherein categorizing includes identifying breaking changes and deprecated features by conducting an assessment of the software library module.

8. A system comprising:

a memory having computer readable program instructions; and one or more processors for executing the computer readable program instructions, the computer readable instructions controlling the one or more processors to perform operations comprising:

identifying a software library module being used in a software application;

identifying dependencies and upgrades for the software library module;

identifying a latest software library module version;

identifying a change.log module for the latest software library module version, wherein the change.log module includes a record of all changes to the software library module;

categorizing breaking changes and deprecated features for the latest software library module version; and generating an upgrade score and suggesting recommendations responsive to the upgrade score, wherein generating the upgrade score includes processing the categorized breaking changes and deprecated features for the latest software library module version.

9. The system of claim 8, wherein identifying includes determining if there are library patches or other upgrades for the software library module.

10. The system of claim 9, further including examining a Package.json module for the software application to determine project information.

11. The system of claim 8, further including conducting a specific library assessment to determine the dependencies.

12. The system of claim 11, wherein conducting the specific library assessment includes assessing library content and searching websites for relevant information regarding the library content.

13. The system of claim 12, wherein conducting the specific library assessment includes testing the specific library assessment to determine if the upgrades will generate any critical, major or minor issues.

14. The system of claim 8, wherein categorizing includes identifying breaking changes and deprecated features by conducting an assessment of the software library module.

15. A computer program product comprising a computer readable storage medium having computer readable program instructions embodied therewith, the computer readable program instructions executable by one or more processors to cause the one or more processors to perform operations comprising:

identifying a software library module being used in a software application;

identifying dependencies and upgrades for the software library module;

identifying a latest software library module version;

identifying a change.log module for the latest software library module version, wherein the change.log module includes a record of all changes to the software library module;

categorizing breaking changes and deprecated features for the latest software library module version; and generating an upgrade score and suggesting recommendations responsive to the upgrade score, wherein generating the upgrade score includes processing the categorized breaking changes and deprecated features for the latest software library module version.

16. The computer program product of claim 15, wherein identifying includes determining if there are library patches or other upgrades for the software library module.

17. The computer program product of claim 16, further including examining a Package.json module for the software application to determine project information.

18. The computer program product of claim 15, further including conducting a specific library assessment to determine the dependencies.

19. The computer program product of claim 18, wherein conducting the specific library assessment includes, assessing library content and searching websites for relevant information regarding the library content; and testing the specific library assessment to determine if the upgrades will generate any critical, major or minor issues.

20. The computer program product of claim 15, wherein categorizing includes identifying breaking changes and deprecated features by conducting an assessment of the software library module.

* * * * *